(12) United States Patent
Yasuda et al.

(10) Patent No.: US 8,332,601 B2
(45) Date of Patent: Dec. 11, 2012

(54) STORAGE CONTROLLER HAVING VIRTUAL VOLUME

(75) Inventors: Miyuki Yasuda, Sagamihara (JP); Naoki Hino, Hiratsuka (JP); Kouichi Aihara, Zama (JP)

(73) Assignee: Hitachi, Ltd., Tokyo (JP)

( * ) Notice: Subject to any disclaimer, the term of this patent is extended or adjusted under 35 U.S.C. 154(b) by 497 days.

(21) Appl. No.: 12/292,726

(22) Filed: Nov. 25, 2008

(65) Prior Publication Data

US 2010/0082924 A1   Apr. 1, 2010

(30) Foreign Application Priority Data

Sep. 26, 2008  (JP) .................................. 2008-247010

(51) Int. Cl.
*G06F 13/00*  (2006.01)
(52) U.S. Cl. ................................. 711/162; 711/E12.014
(58) Field of Classification Search .................. 711/162, 711/170
See application file for complete search history.

(56) References Cited

U.S. PATENT DOCUMENTS

| | | | | |
|---|---|---|---|---|
| 5,720,026 | A * | 2/1998 | Uemura et al. ................. | 714/6.3 |
| 7,725,651 | B2 * | 5/2010 | Saito ............................. | 711/114 |
| 2004/0268070 | A1 * | 12/2004 | Hasegawa ...................... | 711/162 |
| 2005/0091455 | A1 | 4/2005 | Kano et al. | |
| 2007/0050575 | A1 * | 3/2007 | Uratani et al. ................. | 711/162 |
| 2008/0177809 | A1 | 7/2008 | Murayama et al. | |
| 2009/0055593 | A1 * | 2/2009 | Satoyama et al. ............ | 711/134 |

FOREIGN PATENT DOCUMENTS

| | | |
|---|---|---|
| JP | 09-101912 | 4/1997 |
| JP | 2003-15915 | 7/2001 |
| JP | 2002-328847 | 11/2002 |
| JP | 2005-018233 | 1/2005 |
| JP | 2008-181271 | 1/2007 |

OTHER PUBLICATIONS

Notification of Reason(s) for Refusal dispatched by the Japanese Patent Office on Mar. 1, 2011 in Patent Application No. 2008-247010 (3 pages) along with a partial English language translation (2 pages).

\* cited by examiner

*Primary Examiner* — Edward Dudek, Jr.
*Assistant Examiner* — Sean D Rossiter
(74) *Attorney, Agent, or Firm* — Stites & Harbison, PLLC; Juan Carlos A. Marquez, Esq.

(57) ABSTRACT

To shorten time necessary for performing backup of data in a virtual volume managed by a storage controller to a backup destination storage device. A secondary volume including storage areas of the same number as the number of first primary virtual areas is created with respect to a primary virtual volume (a virtual logical volume to be an I/O destination from an external device) including plural primary virtual areas. The first primary virtual areas are primary virtual areas to which actual areas are allocated. Data copy is performed from the primary virtual volume to the secondary volume. At the time of backup to the backup destination storage device, data backup is performed from the secondary volume to the backup destination storage device.

14 Claims, 19 Drawing Sheets

FIG. 4

| VOLUME ID | SEGMENT | ALLOCATION | DIFFERENCE |
|---|---|---|---|
| 0a | #00 | 1 (#05) | 0 |
| | #01 | 0 | 0 |
| | #02 | 0 | 0 |
| | #03 | 0 | 0 |
| | #04 | 0 | 0 |
| | #05 | 1 (#01) | 1 |
| | #06 | 0 | 1 |
| | #07 | 0 | 0 |
| | #08 | 0 | 0 |
| | #09 | 0 | 0 |
| | #10 | 1 (#02) | 1 |
| | #11 | 1 (#09) | 0 |
| | .... | .... | .... |

| VOLUME ID (COPY SOURCE) | VOLUME ID (COPY DESTINATION) | DATE AND HOUR | BACKUP TYPE | COPY DESTINATION VOL SIZE | COPY SOURCE SEGMENT | COPY DESTINATION SEGMENT | RESTORE TARGET |
|---|---|---|---|---|---|---|---|
| 0a | 1a | 20081112 2300 | full | 3 SEGMENTS | 2<br>7<br>9 | 0<br>1<br>2 | 1 |
| | 1b | 20081113 2300 | diff | 3 SEGMENTS | 10<br>11<br>13 | 0<br>1<br>2 | 1 |
| | 1c | 20081114 2300 | diff | 3 SEGMENTS | 1<br>5<br>6 | 0<br>1<br>2 | 1 |
| | 1d | 20081113 2300 | diff | 2 SEGMENTS | 10<br>11 | 0<br>1 | 0 |
| | ... | ... | ... | ... | ... | ... | ... |

| POOL# | POOL VOL | ACTUAL AREA | STATUS |
|---|---|---|---|
| 01 | 8a | 0 | 1 |
| | 8a | 1 | 0 |
| | .. | .. | .. |
| | 8c | 999 | 1 |

71

STORAGE CONTROLLER HAVING VIRTUAL VOLUME

CROSS REFERENCES TO RELATED APPLICATIONS

This application relates to and claims priority from Japanese Patent Application No. 2008-247010, filed on Sep. 26, 2008, the entire disclosure of which is incorporated herein by reference.

BACKGROUND OF THE INVENTION

1. Field of the Invention

The invention relates to data backup in virtual volumes managed by a storage controller.

2. Description of the Related Art

A capacity expansion technique is known (for example, JP-A-2003-15915 (Patent Document 1)). In the capacity expansion technique, when write is generated with respect to a certain virtual area in a virtual volume, an unallocated actual area in a pool is allocated to the virtual area of a write destination, and a data element as a write target is written in the actual area.

Data in logical volumes can be backed up by each volume. In the case that data in virtual volumes are backed up by each volume, reading is generated with respect to all virtual areas, therefore, reading is generated also with respect to virtual areas to which actual areas are not allocated. That is unnecessary reading.

In addition, meaningless data elements (for example, null data elements) obtained by the reading are also backed up with significant data elements (data elements read from actual areas allocated to the virtual volume). Accordingly, meaningless data elements are stored in a backup destination, therefore, the storage capacity is consumed uselessly.

Furthermore, in restore of data in the virtual volume, not only significant data elements but also the meaningless data elements are restored, therefore, actual areas are allocated to all virtual areas included in the restored virtual volume. As a result, actual areas will be consumed more than actual areas allocated to the virtual volume at the time of backup, in addition, longer time is necessary for restore.

In view of the above problems, for example, a technique disclosed in JP-A-2008-181271 (Patent Document 2) has been devised.

Patent Document 1: JP-A-2003-15915
Patent Document 2: JP-A-2008-181271

SUMMARY OF THE INVENTION

Data in the virtual volume managed by the storage controller is sometimes backed up to a storage device of a backup destination. It is desirable to shorten time necessary for the backup.

An object of the invention is to shorten time necessary for backup of data in virtual volumes managed by a storage controller in a backup destination storage device.

As an I/O destination in accordance with an I/O command from a first external device, there is a primary virtual volume including plural primary virtual areas. In the case that write occurs with respect to any of primary virtual areas, an unallocated actual area in a pool is allocated to the write destination primary virtual area, and a data element of a write target is written in the allocated actual area.

The storage controller creates a secondary volume including storage areas of the same number as the number of first primary virtual areas with respect to the primary virtual volume. The secondary volume is, for example, a secondary virtual logical volume, and the storage areas are secondary virtual storage areas. The first primary virtual areas are primary virtual areas to which actual areas are allocated.

The storage controller performs data copy from the primary virtual volume to the secondary volume. Therefore, respective data elements stored in respective actual areas allocated to the primary virtual volume are written in the secondary volume (for example, respective actual areas allocated to the secondary virtual volume).

The first external device is, for example, a computer. However, it is not limited to the computer but other storage devices can be applied.

The storage controller may be, for example, a storage device including physical storage media as bases of the pool, or may be a device existing in a higher order of the storage device having the physical storage media (for example, a switch device).

At the time of backup to a backup destination storage device, a control module performs data backup from the secondary volume to the backup destination storage device. The control module is provided at any of second external devices of the following (1) and (2).

(1) a backup destination storage device, or
(2) a backup server connected to the backup destination storage and the storage controller The control module is realized by, for example, a computer program executed by a CPU in the second external device.

BRIEF DESCRIPTION OF THE DRAWINGS

FIG. 4 is a configuration example of a segment management table;

FIG. 5 is a configuration example of a SVOL management table;

FIG. 18 shows a configuration example of an actual area management table 71.

DESCRIPTION OF THE PREFERRED EMBODIMENTS

Hereinafter, an embodiment of the invention will be explained with reference to the drawings. In the following explanation, processing will be explained by appropriately taking a computer program as a subject in order to prevent the explanation from being redundant, however, the processing is actually performed by a processor which executes the computer program.

Figure 1:
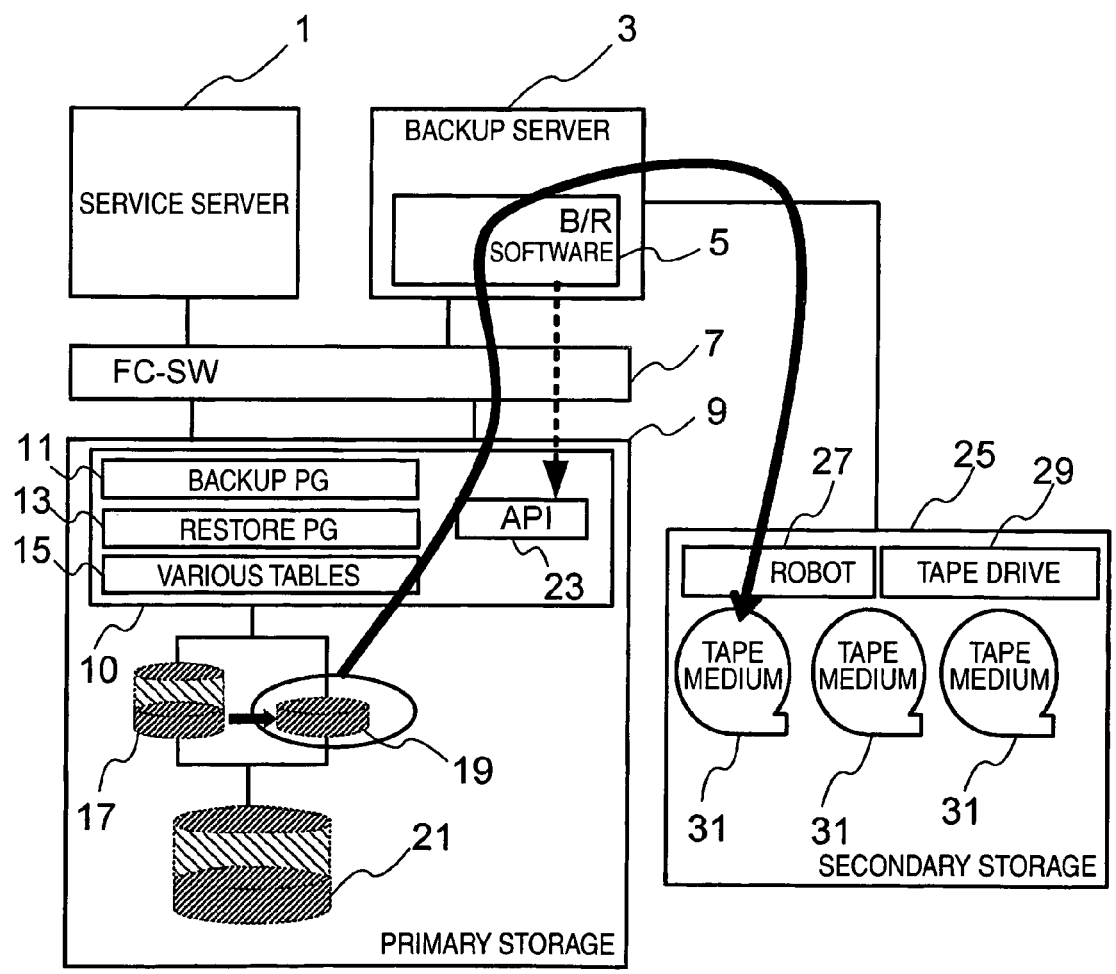
FIG. 1 is a configuration example of a computer system according to an embodiment of the invention.

FIG. 1 shows a configuration example of a computer system according to an embodiment of the invention.

A service server 1, a backup server 3 and a primary storage 9 are connected to a FC-SW (Fible Channel Switch) 7 which forms a storage area network. The backup server 3 is connected to a secondary storage 25 through a communication network or a leased line. The service server 1, the backup server 3 and the primary storage 9 may be connected to other types of communication networks such as a LAN (Local Area Network), or connected to one another through a lease line and the like.

The service server 1 and the backup server 3 are computers having information processing resources such as a CPU (Central Processing Network) and a memory, which are, for example, a personal computer, a work station, a mainframe and the like. In the embodiment, only one service server 1 is written, however, more service servers are allowed to be provided.

In the memory of the backup server 3, for example, a computer program (hereinafter, referred to as a "B/R software" for convenience) 5 for controlling backup and restore is stored as a computer program executed by the CPU in the server 3. The B/R software 5 issues various commands to an API (Application Programming Interface) 23 provided by the primary storage 9 as shown by a dotted arrow. The B/R software 5 also performs relay of data transfer from the primary storage 9 to the secondary storage 25 or data transfer from the secondary storage 25 to the primary storage 9.

The secondary storage 25 includes plural (or one) tape media 31, a robot 27 moving the tape media 31 and a tape drive 29 which writes or reads data with respect to tape media 31. The secondary storage 25 is a storage device of backup destination. The secondary storage 25 is not limited to a tape library device as shown in the drawing but it may be other storage devices, for example, a storage device having the same configuration as the primary storage.

The FC-SW7 connects the service server 1, the backup server 3 and the primary storage 9 mutually.

Figure 19:
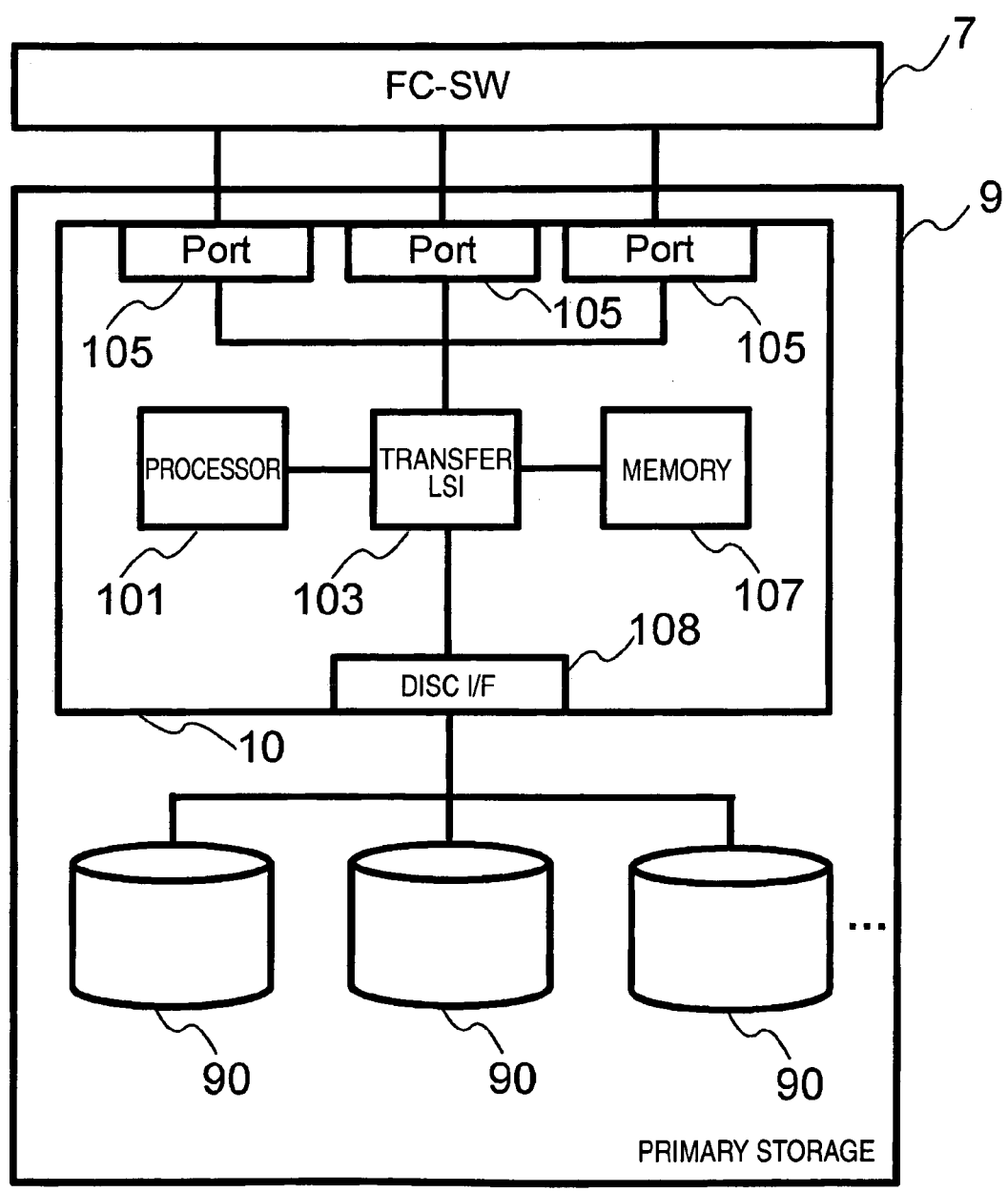
FIG. 19 shows a hardware configuration of a primary storage 9.

The hardware configuration of the primary storage 9 is shown in, for example, FIG. 19. The primary storage 9 is a storage device including a controller 10 and plural HDDs (Hard Disk Drive) 90 (it is preferable that other types of physical storage media (for example, a flash memory) can be applied instead of the HDD 90). The controller 10 includes plural ports 105, a memory 107, a transfer LSI (Large Scale Integration) 103, a processor 101, and a disk I/F 108. In the plural ports 105, there is a port which receives I/O (Input/Output) commands from the service server 1 and there is also a port which receives commands from the backup server 3. The I/O commands are received by a prescribed protocol (for example, a FC (Fible Channel) protocol) and the commands from the backup server 3 are received by the same protocol or another protocol (for example, an IP (internet Protocol). The memory 107 includes a cache area, and data exchanged between the service server 1 and the HDD 90 or data exchanged between the HDD90 and the backup server 3 are temporarily stored in the cash area. The transfer LSI 103 controls exchange between respective elements in the controller 10. The disk I/F 108 is an interface with respect to the HDDs 90.

Referring to FIG. 1 again, the controller 10 (strictly, the memory 107) includes a backup PG 11, a restore PG 13 and various tables 15 ("PG" is an abbreviation of a program). An API 23 for the backup PG 11 and the restore PG 13 is prepared. The primary storage 9 also includes a primary virtual volume and a pool group 21. The backup PG 11 and the restore PG will be described later. The pool group 21 includes plural actual areas.

In the embodiment, data in the primary virtual volume is not transferred to the backup server 3 but a secondary virtual volume 19 which will be a copy destination of data in the primary virtual volume 17 is created, and data in the secondary primary virtual volume 19 is transferred to the backup server 3. The storage capacity of the secondary virtual volume 19 to be created is not the same as the storage capacity of the primary storage volume 17 but the storage capacity corresponding to one or more actual areas allocated to the primary virtual volume 17.

The B/R software 5 performs data backup from the creased secondary virtual volume 19 to the tape medium 31 in the secondary storage 25 as shown in a solid arrow. In the data backup, for example, a raw data copy is performed. The "raw data copy" means data copy in a so-called raw mode, which is data copy using a function of reading data directly from a sector in the HDD (that is, copy which is different from copy by each track or by each file).

In the following description, the primary virtual volume is referred to as "PVOL" and the secondary virtual volume is referred to as "SVOL".

Figure 2:
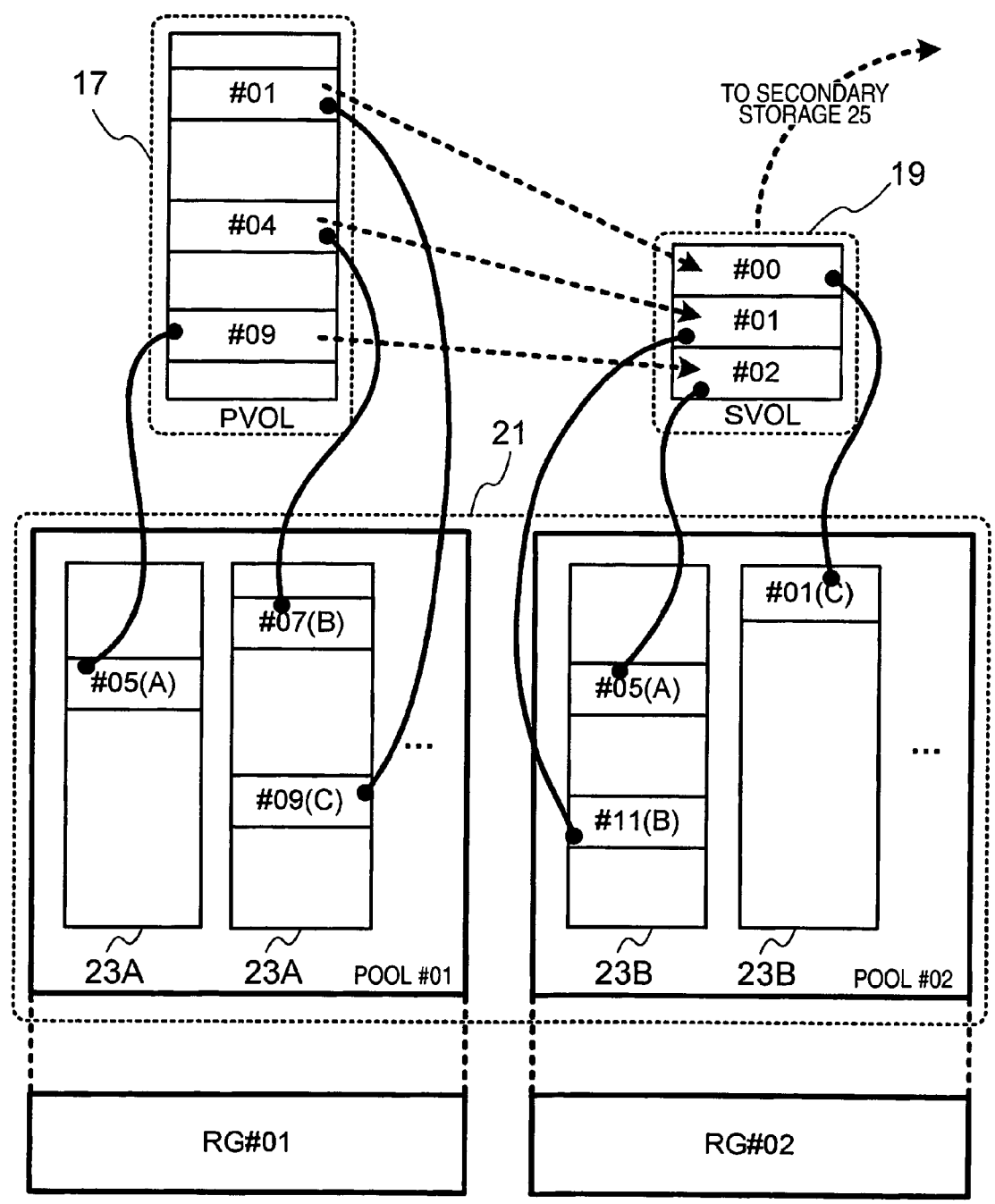
FIG. 2 shows configurations of a PVOL 17 and a SVOL 19 as well as an example of allocation of actual areas with respect to the PVOL 17 and the SVOL 19.

FIG. 2 shows configurations of the PVOL 17 and SVOL 19 as well as an example of allocation of actual areas with respect to the PVOL 17 and the SVOL 19.

The pool group 21 is configured by plural pools including a pool #01 and a pool #02. A pool 21A is configured by a logical volume (pool volume) 23A formed based on a RAID group (RG #01) and a pool 21B is configured by a pool volume 23B formed based on a RAID group (RG #02) which is different from the RG #01 which is the basis of the pool 21A. Respective pool volumes 23A, 23B include plural actual areas. Each RAID group includes plural HDDs 90, storing data in a prescribed RAID (Redundant Array of Independent (or Inexpensive) Disks) level.

The PVOL 17 includes plural segments (virtual areas). The segment and the actual area respectively have a prescribed storage capacity. The capacity of one segment is, for example, the same as the capacity of one actual area.

According to the example of FIG. 2, actual areas #09, #07 and #05 in the pool #01 are allocated to segments #01, #04 and #09 of plural segments. A data element "C" is stored in the actual area #09, a data element "B" is stored in the actual area #07 and a data element "A" is stored in the actual area #05. Specifically, for example, in the case that the controller 10 receives a write command designating an address (for example, LBA (Logical Block Address) of the segment #01 from the service server 1, when an actual area is not allocated to the segment #01, the unallocated actual area #09 in the pool #01 is allocated to the segment #01 and the data element "C" as a write target in accordance with the received write command is written in the allocated actual area #09.

When the SVOL 19 corresponding to the PVOL 17 is created at this time, the number of segments included in the SVOL 19 is 3. Because the number of allocated segments in the PVOL 17 is also 3. The allocated segment is a segment to which an actual area is allocated in plural segments. In the following description, a segment in the PVOL 17 is referred to as a "segment P" and a segment in the SVOL 19 is referred to as a "segment S".

Data copy is performed from the PVOL 17 to SVOL 19. One allocated segment P corresponds to one segment S. According to FIG. 2, the allocated segment P#01 corresponds to the segment S#00, the allocated segment P#04 corresponds to the segment S#01 and the allocated segment P#09 corresponds to the segment S#02. Data copy is performed from the allocated segment P to the allocated segment S between segments corresponding to each other. At that time, actual areas are allocated to segments S from the pool #02 which is different from the pool #01 having actual areas to be allocated to the PVOL 17. This is for prevent data copied in the SVOL 19 from being lost if failures occur in the RG#01. According to FIG. 2, an actual area #01 in the pool #02 is allocated to the segment S#00, and the data element "C" is written in the actual area #01 in the pool #02 by the copy of the data element "C" from the allocated segment P#01 to the segment S#00. An actual area #11 in the pool #02 is allocated to the segment S#01, and the data element "B" is written in the actual area #11 in the pool #02 by the copy of the data element "B" from the allocated segment P#04 to the segment S#01. Similarly, an actual area #05 in the pool #02 is allocated to the segment S#02, and the data element "A" is written in the actual area #05 in the pool #02 by the copy of the data element "A" from the allocated segment P#09 to the segment S#02.

Data is backed up from the SVOL 19 to the secondary storage 25. That is, the data elements "C", "B" and "A" are read from the actual areas #01, #11 and #05 in the pool #02 which are allocated to the segments #00 to #02 included the SVOL 19, and the data elements "C", "B" and "A" are backed up to the secondary storage 25 through the backup server 3. In this case, the actual areas are allocated to all segments S included in the SVOL 19, therefore, reading is sequentially performed from the first address of the SVOL 19 to the end address, thereby reading all data elements to be backed up.

As various tables 15 shown in FIG. 1, for example, there are a virtual volume management table, a segment management table, an actual area management table and a SVOL management table. The various tables will be explained below.

Figure 3:
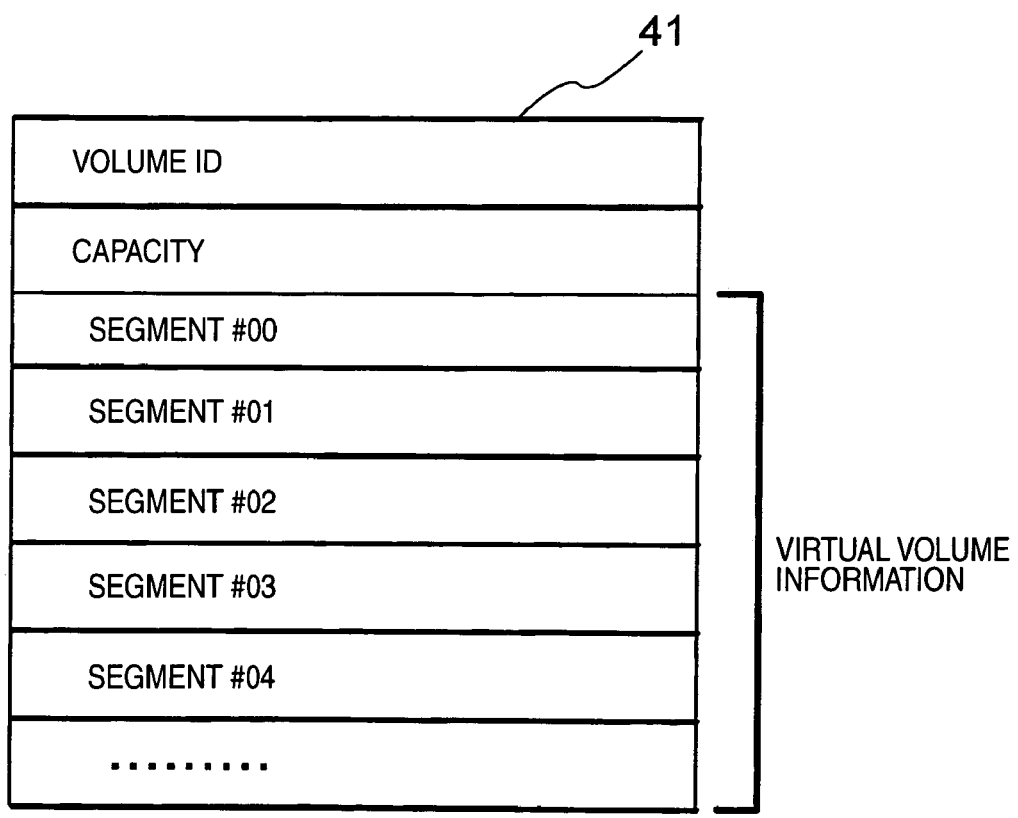
FIG. 3 shows a configuration example of a virtual volume management table.

FIG. 3 shows a configuration example of a virtual volume management table 41.

The virtual management table 41 is a table prepared for each virtual volume, which is a table for managing information concerning the virtual volume. In the virtual volume management table 41, for example, a volume ID, capacity information and virtual volume information are recorded.

The volume ID is an identifier of a virtual volume (referred to as a "target virtual volume" in explanation of FIG. 3 below) corresponding to the table 41. The target virtual volume is, for example, the PVOL 17 or the SVOL 19.

The capacity information is information indicating the capacity of the target virtual volume, and the capacity thereof is, for example, a multiplier of the number of segments included in the virtual volume and the capacity of segments (the number of segments×the segment capacity).

The virtual volume information is information including numbers and LBAs (Logical Block Address) of respective segments included in the target virtual volume.

FIG. 4 shows a configuration example of a segment management table 43.

The segment management table 43 is a table prepared for each virtual volume, which is a table for managing information concerning respective segments of the virtual volume. In the segment management table 43, for example, a volume ID is recorded, as well as a segment number, allocation information and difference information are recorded by each segment.

The volume ID is an identifier of the virtual volume (referred to as "a target virtual volume" in explanation of FIG. 4 below) corresponding to the table 43.

The segment number is an identification number allocated to a segment included in the target virtual volume.

The allocation information is information indicating which actual area is allocated to which segment. For example, the allocation information includes an allocation flag and information for identifying an allocated actual area (for example, an actual area number). An allocation flag "1" means that an actual area is allocated to a segment corresponding to the flag, and an allocation flag "0" shows that an actual area is not allocated to a segment corresponding to the flag. Information for identifying the allocated actual area is written when the allocation flag is "1".

The difference information is information indicating whether update (write) has occurred or not in the segment after the data copy from the PVOL 17 to the SVOL 19 at the time just before (in other words, the difference information is information indicating whether the data element stored in the actual area allocated to the segment is a difference data element or not). The difference information includes a difference flag of 1-bit. A difference flag "1" means that update has occurred in the segment corresponding to the flag after the data copy at the time just before, and a difference flag "0" means that update has not occurred in the segment corresponding to the flag after the data copy at the time just before. A segment corresponding to the difference flag "1" is referred to as a "difference segment" in the following description. The difference segment is also an allocation segment, however, the allocation segment is not always the difference segment. When update has occurred in the allocation segment after the data copy, the allocation segment will be the difference segment. When update has occurred in a segment other than the allocation segment after the data copy, the segment will be the difference segment.

The table 43 is updated by the controller 10 when the actual area is allocated to any of segments or when update occurs first in a certain segment after the data copy.

FIG. 18 shows a configuration example of an actual area management table 71.

The actual area management table 71 is a table for managing whether allocation has been performed or not with respect to respective actual areas. The actual area management table 71 is prepared for each pool. In the table 71, a pool number is recorded, and a pool volume ID, an actual area number and status information are recorded by each actual area. The pool number is an identification number of a pool corresponding to the table 71. The pool volume ID is an ID of a pool volume in which the actual area exists, the actual area number is an identification number of the actual area and the status information indicates whether the actual area has been allocated to the virtual volume (for example "1") or has not been allocated (for example, "0").

The table 71 is updated when any of actual areas is allocated to a segment or when the allocation of the actual area has been cancelled from any of segments by the controller 10.

FIG. 5 shows a configuration example of a SVOL management table 45.

The SVOL management table 45 is a table for managing information concerning data copy from the PVOL 17 to the SVOL 19. The table 45 is prepared for each PVOL 17 and stores information concerning all SVOLs 19 created with respect to one PVOL 17.

In the SVOL management table 45, a volume ID of a PVOL (hereinafter, referred to as a "target PVOL" in explanation of FIG. 5) 17 corresponding to the table 45 is recorded. Also in the table 45, a volume ID of a SVOL, date and hour information, backup type information, copy destination VOL size information, copy source segment information, copy destination segment information and restore target information are recorded by each SVOL corresponding to the target PVOL 17 (namely, by each data copy from the target PVOL to the SVOL). Hereinafter, the above information will be explained by taking one SVOL (hereinafter, referred to as a "target SVOL" in explanation of FIG. 5) corresponding to the target PVOL as an example.

The date and hour information is information indicating a date and hour when the data copy was performed from the target PVOL to the target SVOL.

The backup type information is information indicating a backup type corresponding to the target SVOL. As the backup type, there are full-backup and difference backup. The full-backup means that data in all allocation segments P in the target PVOL is backed up. The difference backup means that data in a difference segment P of plural allocation segments P in the target PVOL is backed up. When the full-backup is designated, "full" is recorded as backup type information and when the difference backup is designated, "diff" is recorded.

The copy destination VOL size information is information indicating the size (capacity) of the target SVOL. The size of the target SVOL is, for example, indicated by the number of segments included in the target SVOL.

The copy source segment information is information indicating allocated segments P as data copy sources in the target PVOL.

The copy destination segment information is information indicating segments S of data copy destinations in the target SVOL.

The restore target information is information whether the target SVOL is a restore target or not. In the case that the target SVOL is the restore target, "1" is recorded as restore target information, and "0" is recorded when the target SVOL is not the restore target.

Figure 6:
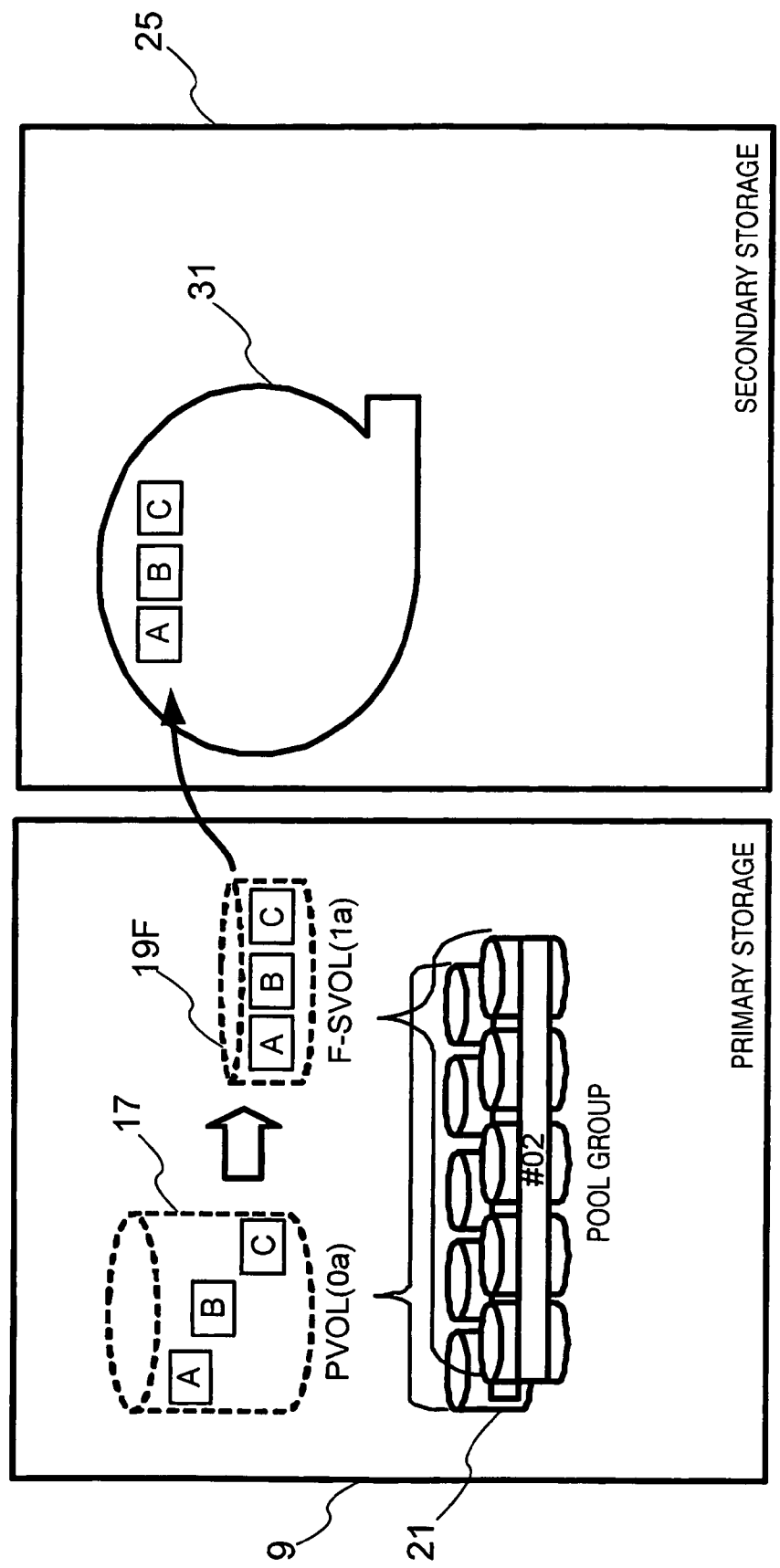
FIG. 6 shows the concept of full-backup.

FIG. 6 shows the concept of the full-backup.

In the full-backup, a SVOL (hereinafter, F-SVOL) 19F including segments S of the same number as the number of allocated segments P in the PVOL 17 as described above. Then, data copy is performed from all allocated segments P to all segments S. Accordingly, the data elements A to C stored in three actual areas (actual areas in the pool#01) allocated to three allocated segments P are copied to three actual areas (actual areas in the pool#02) allocated to three segments S included in the F-SVOL 19F. All data elements A to C are read from the F-SVOL 19F and the read data elements A to C are backed up in the tape medium 31 in the secondary storage 25. Specifically, for example, raw-data copy from the F-SVOL 19F to the tape medium 31 is performed.

According to the backup, the F-SVOL 19F including only the allocated segments S corresponding to the allocated segments P in the PVOL 17 is created, and data backup is performed from the F-SVOL 19F. Therefore, high-speed backup without unnecessary reading and data transfer can be expected.

Note that the F-SVOL 19F may be deleted after the backup from the F-SVOL 19F to the tape medium 31 is completed.

Figure 7:
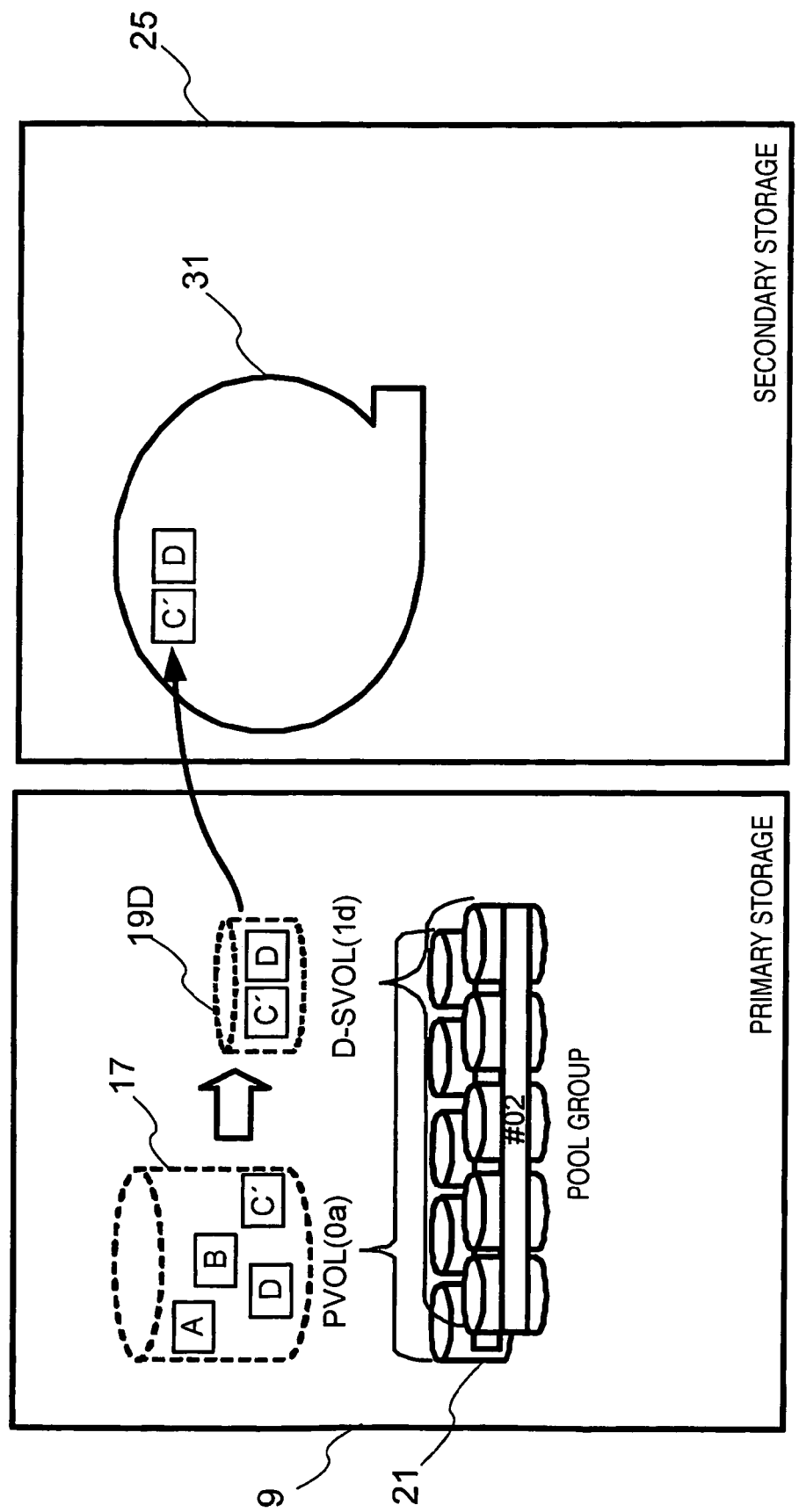
FIG. 7 shows the concept of difference backup.

FIG. 7 shows the concept of the difference backup.

In the difference backup, a SVOL (hereinafter, D-SVOL) 19D including segments S of the same number as the number of difference segments P of the allocated segments P in the PVOL 17 is created as described above. Then, data copy is performed from all the difference segments P to all segments S. Accordingly, data elements C' and D stored in two actual areas (actual areas in the pool #01) allocated to two difference segments P of four allocated segments P are copied to two actual areas (actual areas in the pool #02) allocated to two segments S included in the D-SVOL 19D. All data elements C' and D are read from the D-SVOL 19D and the read data elements C' and D are backed up in the tape medium 31 in the secondary storage 25. Specifically, raw-data copy from the D-SVOL 19D to the tape medium 31 is performed.

According to the backup, the D-SVOL 19D including only the allocated segments S corresponding to difference segments P of the allocated segments P is created, and data backup is performed from the D-SVOL 19D. Therefore, high-speed backup having the lower number of readings and the smaller amount of data can be expected as compared with the full-backup.

Note that the D-SVOL 19D may be deleted after the backup from the D-SVOL 19D to the tape medium 31 is completed.

Figure 8:
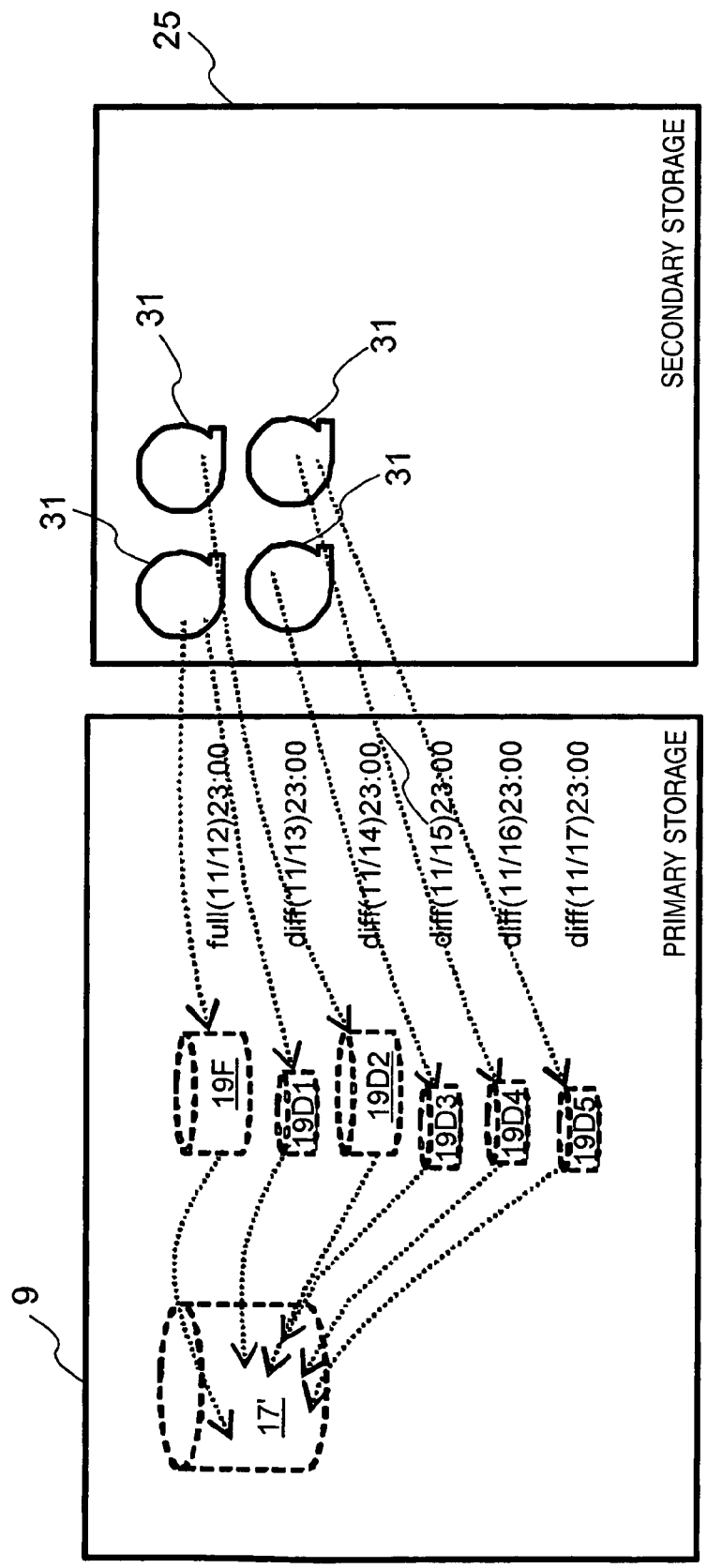
FIG. 8 shows the concept of restoring.

FIG. 8 shows the concept of restoring.

Assume that a PVOL at the point of November 17, 23:00 is a restore target, and assume that a SVOL corresponding to the restore point is a D-SVOL 19D5.

The D-SVOL 19D5 is the SVOL created at the time of the difference backup, therefore, even when the D-SVOL 19D5 is restored from the tape medium 31 in the secondary storage 25 and the data copy is performed from the D-SVOL 19D5 to the PVOL 17' of the restore destination, the PVOL at the time of November 17, 23:00 is not restored.

In this case, the following SVOLs of (1) and (2) will be restored.

(1) F-SVOL 19F created prior as well as nearest to November 17, 23:00
(2) other D-SVOL 19D1 to 19D4 whose data copy was performed at a period from a date and hour of data copy corresponding to the F-SVOL 19F to the restore point November 17, 23:00

Then, the data copy is performed from the SVOLs to the PVOL 17' in the order from a SVOL whose data-copy date and hour are older. Specifically, first, data copy to the restore destination PVOL 17' is performed from the F-SVOL 19F, after that, data copy is performed to the restore destination PVOL 17' from D-SVOL 19D1 to 19D5 in the order from older date and hour of data copy. According to the series of processing, data in the restore destination PVOL 17' will be data in the PVOL at the point of November 17, 23:00.

The restore destination PVOL 17' is, for example, a PVOL having no allocated segment P (that is, the PVOL including only segments to which any actual area is not allocated) in the initial state (that is, before the data copy from the F-SVOL 19F is performed).

The example of FIG. 8 shows a case in which the SVOL corresponding to the restore point is the D-SVOL. In the case that the SVOL corresponding to the restore point is, for example, the F-SVOL 19F shown in the drawing, the F-SVOL 19F is restored from the tape medium 31 and data copy from the F-SVOL 19F to the restore destination PVOL 17' is just performed, thereby completing the restore of the PVOL at the restore point.

In the embodiment, when only the full-backup is performed, one F-SVOL 19F is restored and data copy is performed from one F-SVOL 19F to the restore destination PVOL 17' for performing the restore, therefore, high-speed restore can be expected. On the other hand, when the difference backup is executed in addition to the full-backup, the number of actual areas consumed at the time of backup and the amount of transferred data can be reduced as compared with the case of full-backup.

Hereinafter, the processing flow performed in the embodiment will be explained with respect to FIG. 9 to FIG. 16. In FIG. 9 to FIG. 16, "step" is abbreviated to "S".

Figure 9:
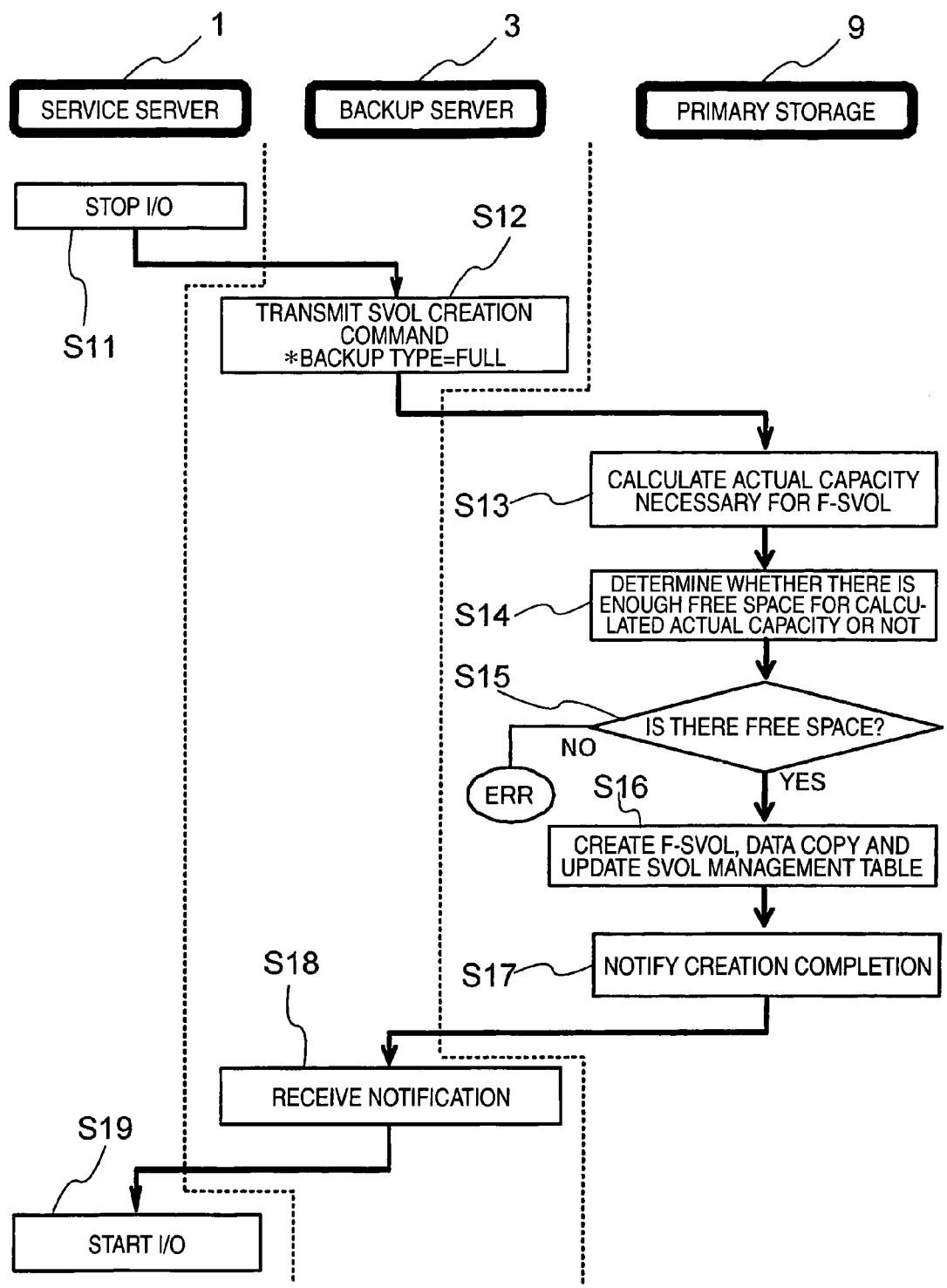
FIG. 9 shows the processing flow for creating a F-SVOL.

FIG. 9 shows the processing flow of creating the F-SVOL 19F.

In S11, the service server 1 stops the issue of I/O commands (for example, the PVOL of the backup target is umounted). This is performed, for example, in response to an instruction from the backup server 3. In this step, it is preferable that only the issue of the I/O command designating the PVOL 17 to be the backup target is stopped and that the issue of other I/O commands designating other logical volumes is performed. The stop of the I/O in the service server 1 is notified to the backup server 3 from, for example, the service server 1.

In S12, the B/R software 5 of the backup server 3 transmits a SVOL creation command to the API 23 of the primary storage 9 in response to the stop of the I/O in the service server 1. In the SVOL creation command, for example, "full-backup" as the backup type and an ID of the PVOL (primary virtual volume) 17 as a volume ID of the backup target are designated (hereinafter, the PVOL is referred to as a "target PVOL" in explanation of FIG. 9 and FIG. 10). When the API 23 accepts the SVOL creation command, the backup PG11 is called and the SVOL creation command is received.

In S13, the backup PG11 detects that the backup type "full-backup" is designated in the SVOL creation command, calculating the actual capacity (the number of actual storage areas) necessary for the F-SVOL. The actual capacity is calculated by "(the storage capacity of one segment)×(the number of allocated segments P)". Which segment P is which allocated segment P is specified by referring to allocation information of the segment management table 43.

In S14, the backup PG11 determines whether there is free space for the actual capacity calculated in S13 in the pool #02 corresponding to the SVOL or not. The free space is calculated by "(the storage capacity of (one) actual area)×(the number of unallocated actual areas). As a modification example, it is preferable to determine whether there exist the same number of unallocated actual areas as the number of allocated segments P in the pool "02 or not in S13 and S14.

When a result of determination in S14 is negative (NO in S15), an error is given back to the backup server 3.

When a result of determination in S14 is affirmative (YES in S15), the backup PG 11 creates the F-SVOL 19F including segments S of the same number as the allocation segment P in S16, and data copy is performed from the allocated segments P in the target PVOL 17 to the F-SVOL 19F. The backup PG 11 also updates the SVOL management table 45 corresponding to the target PVOL 17. Specifically, a record including the volume ID of the F-SVOL 19F is added to the SVOL management table 45 as the volume ID of the copy destination. In the added record, the followings are recorded.

(1) information indicating execution date and hour of the data copy as date and hour information,
(2) "full" as the backup type,
(3) the number of segments S included in the F-SVOL 19F as the copy destination VOL size,
(4) segment information of respective allocated segments P, and
(5) segment information of respective segments S to be copy destinations from respective allocated segments P.

In S17, the backup PG11 transmits notification of creation completion to the backup server 3.

In S18, the backup server 3 receives notification of creation completion from the primary storage 9.

In S19, the I/O stop in the service server 1 is released and it becomes possible to start issuing I/O commands again. The release of the I/O stop is performed in response to an instruction by the B/R software 5 in the backup server 3 which received the notification of creation completion.

Figure 10:
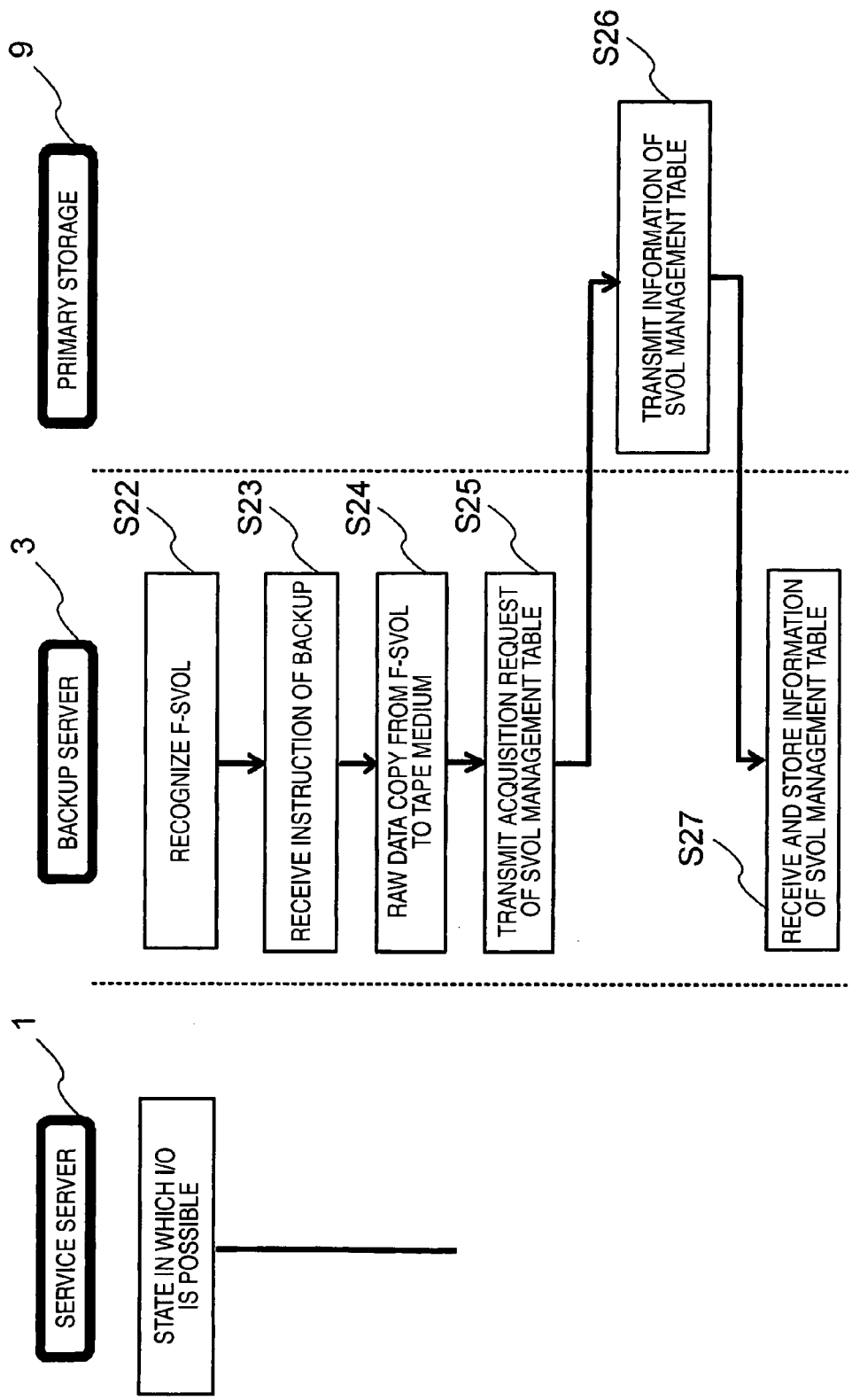
FIG. 10 shows the processing flow of backup from the F-SVOL in a primary storage to a secondary storage.

FIG. 10 shows the processing flow of backup from the F-SVOL in the primary storage to the secondary storage.

During the processing, the service server 1 can issue a write command designating the target PVOL 17.

In S22, the B/R software 5 of the backup server 3 recognizes the F-SVOL 19F created in S16 of FIG. 9. Specifically, for example, the B/R software 5 recognizes the F-SVOL 19F by inquiring information concerning the F-SVOL 19F (for example, a volume ID, the storage capacity and the like) which has been created in response to the SVOL creation command issued in S12 of FIG. 9.

In S23, the B/R software 5 receives an instruction of backup from the F-SVOL 19F to the tape medium 31 by, for example, an administrator.

In S24, the B/R software 5 executes raw-data copy from the F-SOVOL 19F to the tape medium 31. Specifically, for example, the B/R software 5 reads data from the F-SVOL 19F (specifically, actual areas allocated to the F-SVOL 19F) by transmitting a read command in which the F-SVOL 19F is designated, issuing a write command in which the read data is designated as a write target to the secondary storage 25. At that time, the B/R software 5 can write backup management information in which a volume ID of the F-SVOL 19F is associated with write destination information (for example, a number and an LBA range of the tape medium 31) in a storage resource (for example, a memory) in the backup server 3.

In S25, the B/R software 5 transmits an acquisition command of the SVOL management table 45 to the API 23 of the primary storage 9.

In S26, the backup PG11 transmits information of the SVOL management table 45 (for example, a copy of the table 45) to the backup server 3 through the API 23 in response to the acquisition command.

In S27, the B/R software 5 in the backup server 3 receives information of the SVOL management table 45, storing the information in a storage resource (for example, a memory) in the server 3.

Figure 11:
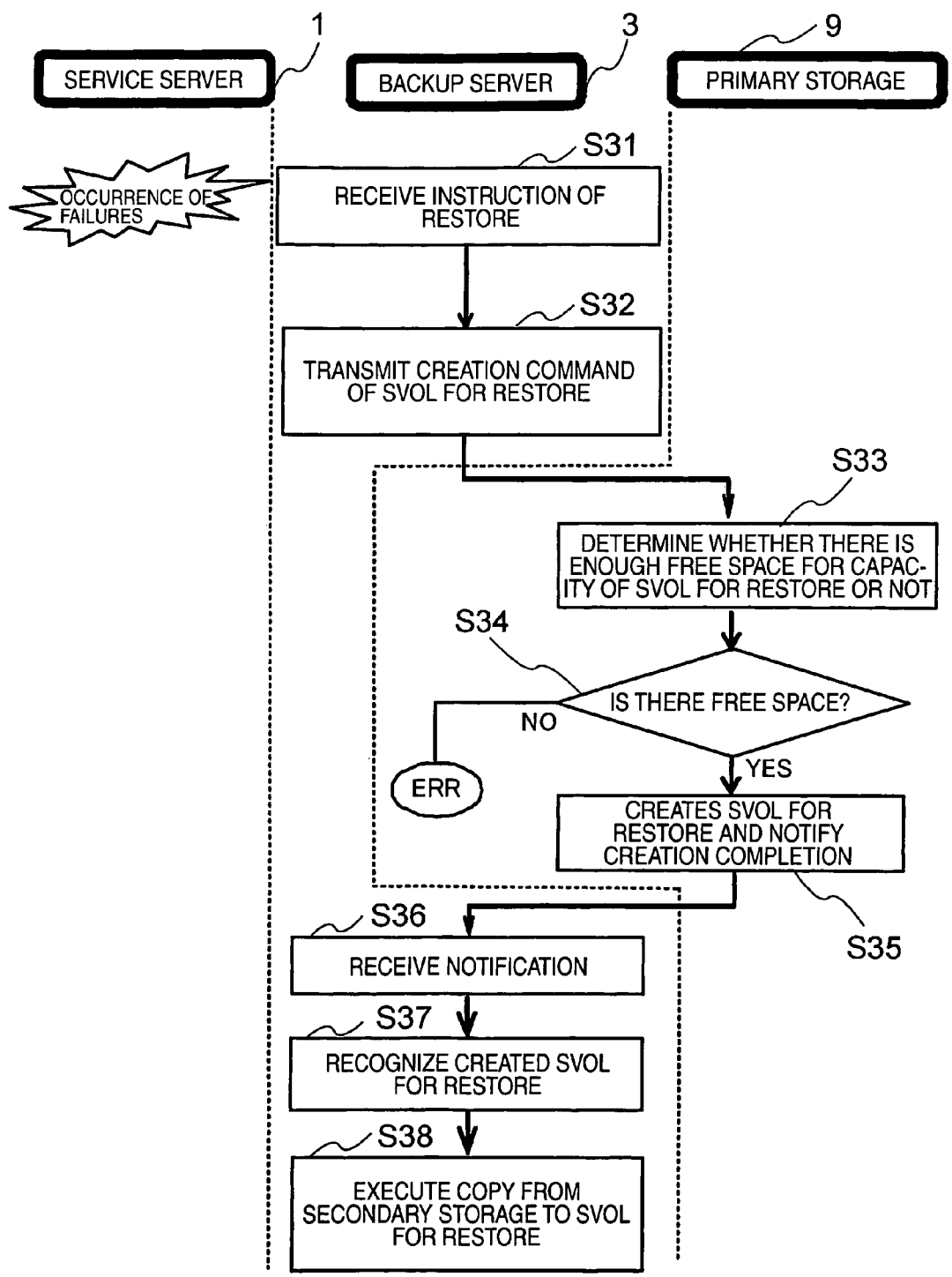
FIG. 11 shows the processing flow of restoring F-SVOL from the secondary storage to the primary storage.

FIG. 11 shows the processing flow of restoring the F-SVOL 19F from the secondary storage 25 to the primary storage 9.

In S31, for example, when failures occur in the service server 1, the B/R software 5 of the backup server 3 receives an instruction for restoring the SVOL from, for example, an administrator. At the time of the restore instruction, designation of restore information is received. The restore information is, for example, restoring date and hour indicating which point of the PVOL is restored or a volume ID. The volume ID can be an ID of the PVOL and can be an ID of the SVOL. The volume ID is, for example, an ID selected from information of the SVOL management table stored in the memory in the backup server 3.

In S32, the B/R software 5 transmits a creation command of a SVOL for restore to the API 23 of the primary storage 9. The command includes, for example, a volume ID of the F-SVOL 19F (hereinafter, a target SVOL 19F in explanation of FIG. 11) corresponding to restore information and information including the capacity of the target SVOL 19F (the number of segments). The storage capacity is specified, for example, based on the copy destination VOL size corresponding to the target SVOL 19F in the information of the SVOL management table. When the API 23 accepts the creation command, the restore PG 13 is called, and the restore PG 13 receives the creation command.

In S33, the restore PG 13 determines whether there is free space for the capacity of the F-SVOL 19F or not based on the actual area management table 71 (refer to FIG. 18) corresponding to a pool which is different from the pool for the PVOL.

When a result of determination in S33 is negative, an error is given back to the backup server 3.

When a result of determination in S33 is affirmative (YES in S34), the restore PG 13 creates the SVOL for restore having the same capacity as the target SVOL 19F, transmitting notification of creation completion to the backup server 3 in S35. The number of segments S included in the SVOL for restore is the same as the number of segments S included in the target SVOL 19F. Also, the same volume ID as the volume ID of the restore target F-SVOL 19F is added to the SVOL for restore. Numbers of segments S included in the SVOL for restore are also the same as numbers of segments S included in the restore target F-SVOL 19F. The SVOL for restore includes only segments S to which actual areas are not allocated, however, it is also preferable that actual areas are allocated to all segments S included in the SVOL for restore at the time of creation.

In S36, the B/R software 5 in the backup server 3 receives the notification of creation completion.

In S37, the B/R software 5 recognizes the SVOL for restore created in S35 in response to the notification of creation completion.

In S38, the B/R software 5 executes data copy (restore) from the tape medium 31 to the SVOL for restore created in S35. Specifically, for example, the B/R software 5 specifies at which tape medium 31 and at which position in the tape medium 31 the data backed up from the target SVOL 19F exists, transmitting a read command designating the specified position to the secondary storage 25. Accordingly, the B/R software 5 issues a write command to the primary storage 9, which designates the SVOL for restore recognized in S37 with the data read from the secondary storage 25 (data stored in the target SVOL 19F) as a write target.

Figure 12:
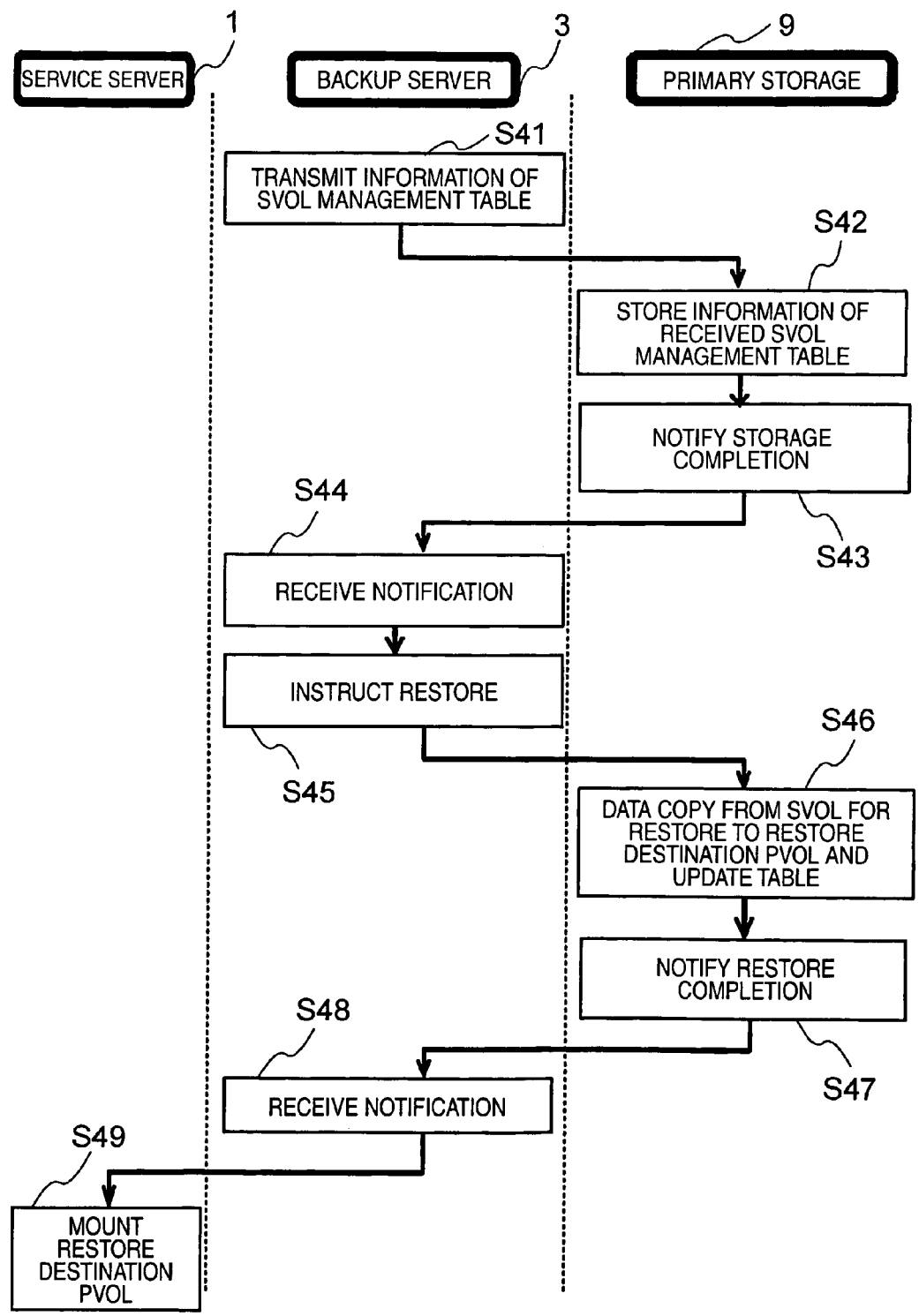
FIG. 12 shows the processing flow of restore from a SVOL for restore (restored F-SVOL) to a PVOL of a restore destination.

FIG. 12 shows the processing flow of the restore from the SVOL for restore (restored F-SVOL) to the PVOL as the restore destination.

In S41, the B/R software 5 transmits information of the SVOL management table 45 stored in the memory of the backup server 3 to the primary storage 9.

In S42, the restore PG 13 receives information of the SVOL management table 45, storing the information in the memory 107.

In S43, the restore PG 13 transmits notification of storage completion to the backup server 3.

In S44, the B/R software 5 receives the notification of storage completion.

In S45, the B/R software 5 transmits a restore command to the restore PG 13, which is an instruction of data copy from the SVOL for restore to the restore destination PVOL 17'. In the restore command, for example, at least one volume ID of the SVOL for restore and the restore destination PVOL 17' is designated.

In S46, the restore PG 13 performs data copy from the SVOL for restore to the restore destination PVOL 17' by referring to information of the SVOL management table 45 in response to the restore command. At that time, the copy source of data is segments S of the data copy destination which are specified from information of the SVOL management table 45, and the copy destination of data is segments P corresponding to the segments P (segments P of the data copy source which are specified from information of the SVOL management table 45). Actual areas are allocated to the segments P with the data copy, and data elements in the actual areas allocated to the copy source segments S are written in the actual areas. At that time, the restore PG13 updates the segment management table 43 corresponding to the restore destination PVOL 17'.

In S47, the restore PG13 transmits notification of restore completion to the backup server 3.

In S48, the B/R software 5 receives the notification of restore completion.

In S49, the service server 1 mounts the restore destination PVOL 17'. Thereby, it is possible to transmit an I/O command designating the restore destination PVOL 17' from the service server 1.

Figure 13:
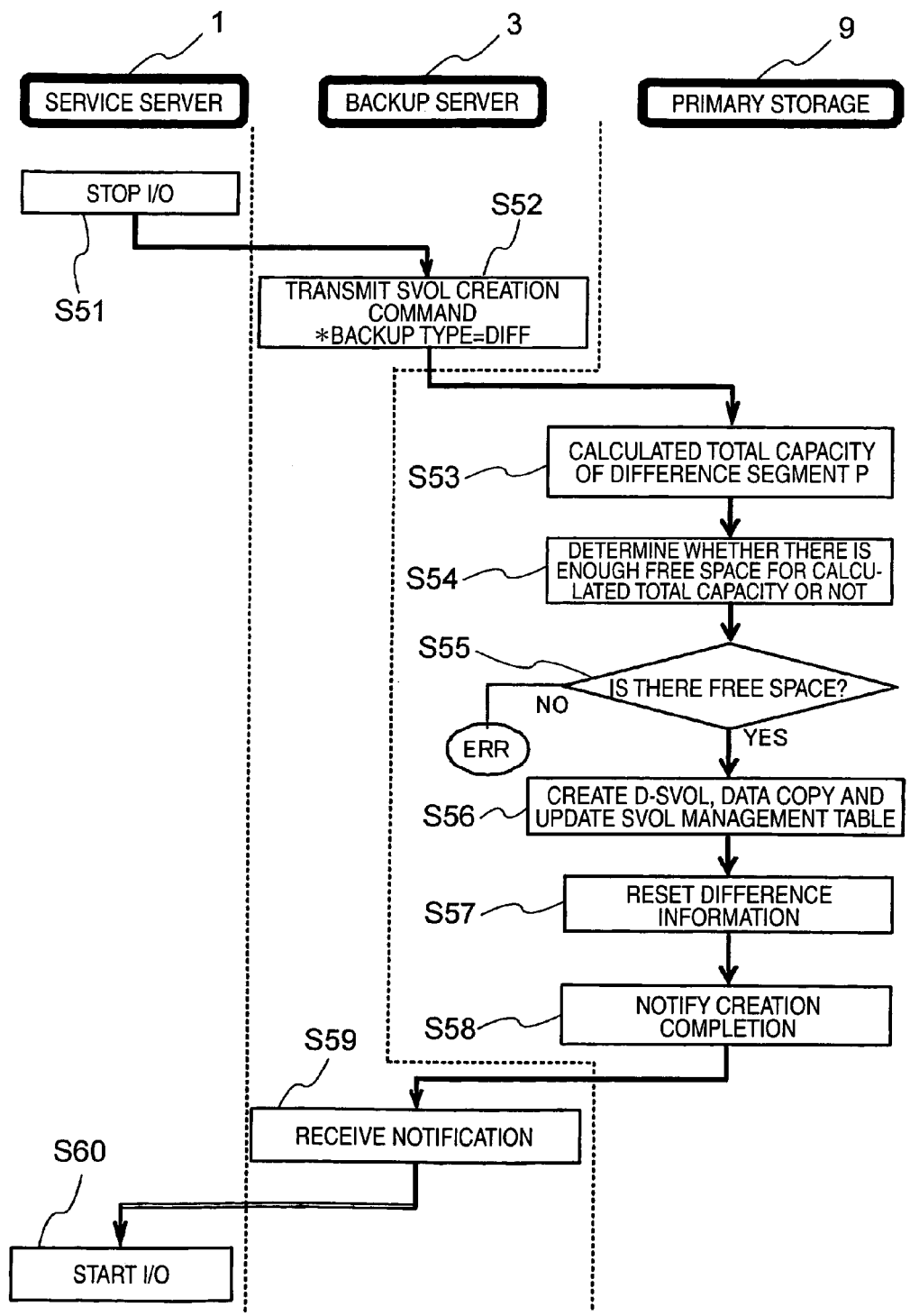
FIG. 13 shows the processing flow of creating a D-SVOL.

FIG. 13 shows the processing flow of creating the D-SVOL 19. In the following description, different points from the explanation of FIG. 9 to FIG. 12 will be chiefly explained and common points will be briefly explained.

In S51, the service server 1 stops issuing I/O commands.

In S52, the B/R software 5 transmits a SVOL creation command to the API 23 of the primary storage 9 in response to the stop of the I/O in the service server 1. In the SVOL creation command, for example, "difference backup" as the backup type and an ID of the PVOL 17 as the volume ID of the backup target are designated (hereinafter, the PVOL is referred to as a "target PVOL" in explanation of FIG. 13 and FIG. 14).

In S53, the backup PG 11 detects that "difference backup" is designated as the backup type in the SVOL creation command, calculating the actual capacity necessary for the D-SVOL (the number of actual areas). The actual capacity can be calculated by "(the storage capacity of one segment)× (the number of difference segments P). Which segment P is which difference segment P corresponds is specified by referring to difference information of the segment management table 43.

In S54, the backup PG 11 determines whether there is free space or not for the actual capacity calculated in S53 in the pool #02 corresponding to the SVOL.

When a result of determination of S54 is affirmative (Yes in S55), the backup PG11 creates the D-SVOL 19D including segments S of the same number as the difference segments P in S56. The backup PG11 performs data copy from difference segments P in the target PVOL 17 to the D-SVOL 19D. The backup PG11 also updates the SVOL management table 45 corresponding to the target PVOL 17. Specifically, a record including a volume ID of the D-SVOL 19D as the copy destination volume ID is added to the SVOL management table 45. The following information is recorded in the added record:

(1) information indicating execution date and hour of the data copy as date and hour information,
(2) "diff" as the backup type,
(3) the number of segments S included in the D-SVOL 19D as the copy destination VOL size,
(4) segment information of respective difference segments P and
(5) segment information of respective segments S to be copy destinations from the respective difference segments P.

In S57, the backup PG11 resets all difference information in the SVOL management table 45 (namely, updates all values to "0").

In S58, the backup PG11 transmits notification of creation completion to the backup server 3.

In S59, the backup server 3 receives notification of creation completion.

In S60, the stop of I/O in the service server 1 is released, and it becomes possible to start issuing I/O commands again.

Figure 14:
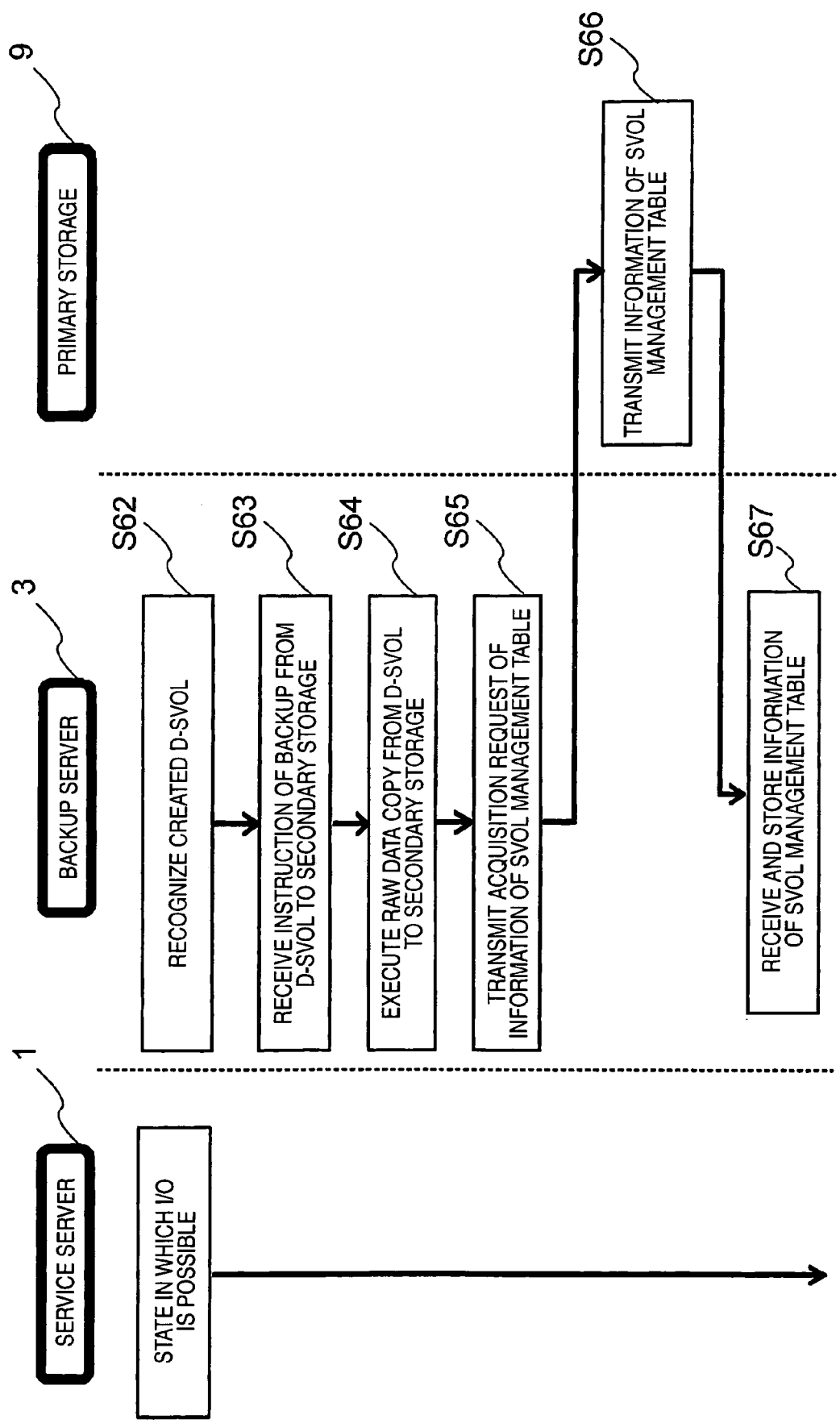
FIG. 14 shows the processing flow of backup from the D-SVOL in the primary storage to the secondary storage.

In FIG. 14, the processing flow of backup from the D-SVOL in the primary storage to the secondary storage is shown.

During the processing, the service server 1 can issue a write command designating the target PVOL 17.

In S62, the B/R software 5 of the backup server 3 recognizes the D-SVOL 19D created in S57 of FIG. 13.

In S63, the B/R software 5 receives an instruction of backup from the D-SVOL 19D to the tape medium 31 from, for example, an administrator.

In S64, the B/R software 5 executes raw-data copy from the D-SVOL 19D to the tape medium 31. At that time, the B/R software 5 can write backup management information in which a volume ID of the D-SVOL 19D is associated with write destination information (for example, a number and an LBA range of the tape medium 31) to a storage resource (for example, a memory) in the backup server 3.

In S65, the B/R software 5 in the backup server 3 transmits an acquisition command of the SVOL management table 45 to the API 23 of the primary storage 9.

In S66, the backup PG11 transmits information of the SVOL management table 45 (for example, a copy of the table 45) to the backup server 3 through the API 23 in response to the acquisition command.

In S67, the B/R software 5 of the backup server 3 receives information of the SVOL management table 45 and stores the information in the storage resource (for example, the memory) in the server 3.

Figure 15:
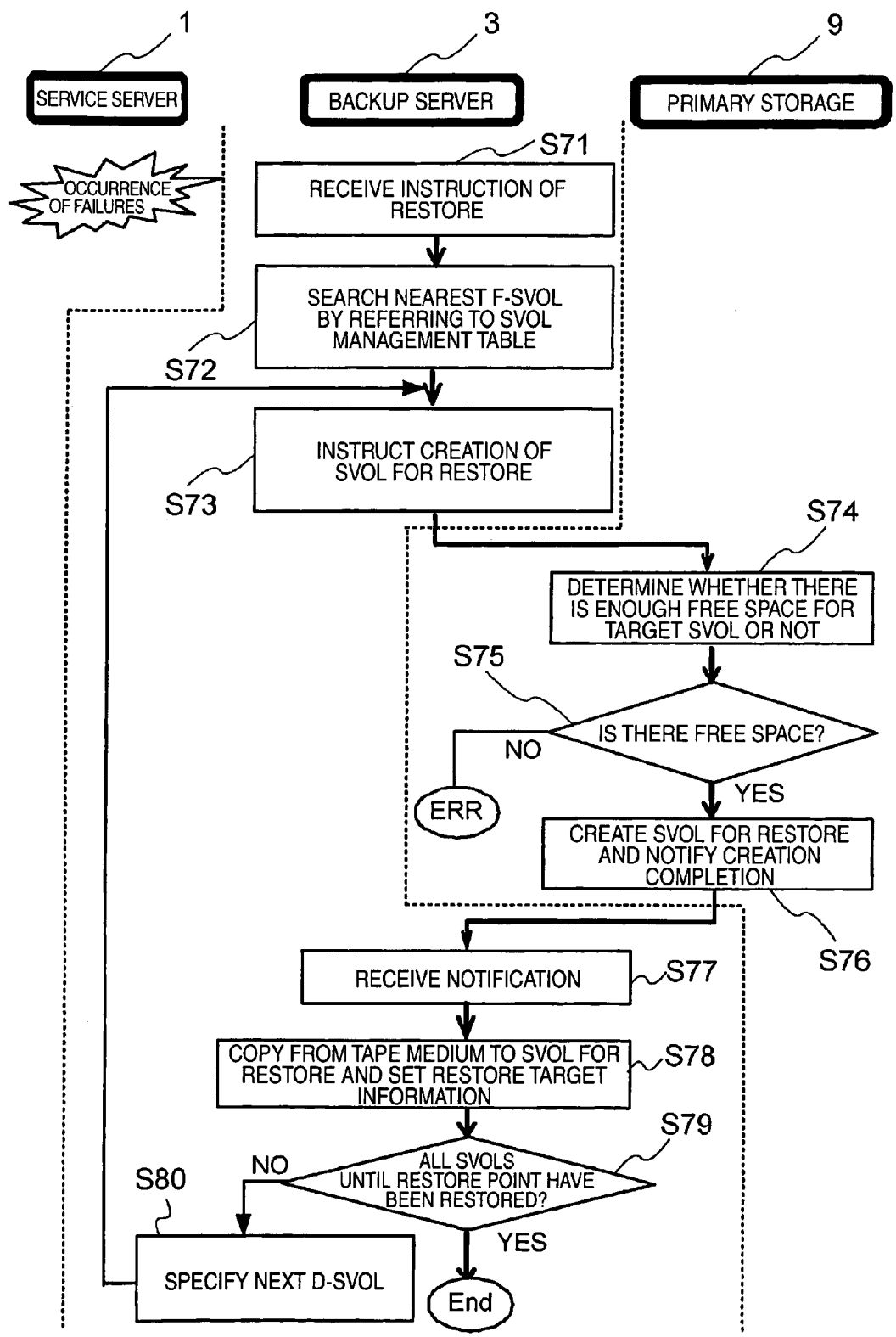
FIG. 15 shows the processing flow of restoring the D-SVOL and F-SVOL from the secondary storage to the primary storage.

FIG. 15 shows the processing flow of restoring the D-SVOL and the F-SVOL from the secondary storage to the primary storage.

In S71, for example, when failures occur in the service server 1, the B/R software 5 of the backup server 3 receives a restore instruction of the SVOL from, for example, an administrator. At the time of restore instruction, designation of restore information can be received. The restore information is, for example, restoring date and hour indicating which point of the PVOL is restored or a volume ID.

In S72, the B/R software 5 searches date and hour information corresponding to the backup type "full" which is prior as well as nearest to the restore point specified from restore information (namely, the F-SVOL which is prior as well as nearest to the restore point is searched) by referring to information of the SVOL management table 45.

In S73, the B/R software 5 transmits a creation command of a SVOL for restore to the API 23 of the primary storage 9. The command includes, for example, information indicating the copy destination VOL size corresponding to the specified date and hour information (namely, the capacity of the target SVOL (the number of segments S) and a volume ID of the target SVOL corresponding to the date and hour information. When the API 23 accepts the creation command, the restore PG 13 is called and the restore PG13 receives the creation command. The target SVOL is a F-SVOL when it is just after S72, and is a D-SVOL when it is just after S80.

In S74, the restore PG 13 determines whether there is free space for the capacity of the target SVOL or not based on the actual area management table 71 (refer to FIG. 18) corresponding to a pool which is different from the pool for the PVOL.

When a result of determination in S74 is affirmative (YES in S75), the restore PG 13 creates the SVOL for restore having the same capacity as the target SVOL in S76, transmitting notification of creation completion to the backup server 3.

In S77, the B/R software 5 in the backup server 3 receives notification of creation completion.

In S78, the B/R software 5 recognizes the SVOL for restore created in S74 in response to the notification of creation completion, executing data copy (restore) from the tape medium 31 to the SVOL for restore created in S74. The B/R software 5 updates restore target information corresponding to the target SVOL in the SVOL management table to "1".

In S79, the B/R software 5 determines whether all SVOLs until the restore point have been restored or not. Specifically, for example, the B/R software 5 determines not only whether restore target information corresponding to the F-SVOL (hereinafter, the nearest F-SVOL) which is prior as well as nearest to the restore point is "1" but also whether restore target information is "1" or not, which corresponds to a D-SVOL (hereinafter, the latest D-SVOL) corresponding to the restore point and all other D-SVOLs whose copy dates and hour are between copy date and hour corresponding to the nearest F-SVOL and copy date and hour corresponding to the latest D-SVOL.

When a result of determination in S79 is negative (No in S79), the B/R software 5 specifies a next D-SVOL in S80. The "next D-SVOL" is a D-SVOL corresponding to copy date and hour nearest to the copy date and hour of the nearest F-SVOL, which is the D-SVOL whose restore target information is "0".

According to the processing flow, S74 is executed whenever the SVOL for restore corresponding to the target SVOL is created, however, it is also preferable that, for example, S74 is performed once, instead of the above. Specifically, the B/R software 5 calculates the capacity of all target SVOLs and notifies the result to the restore PG 13, and the restore PG13 determines whether there is free space for the capacity.

Figure 16:
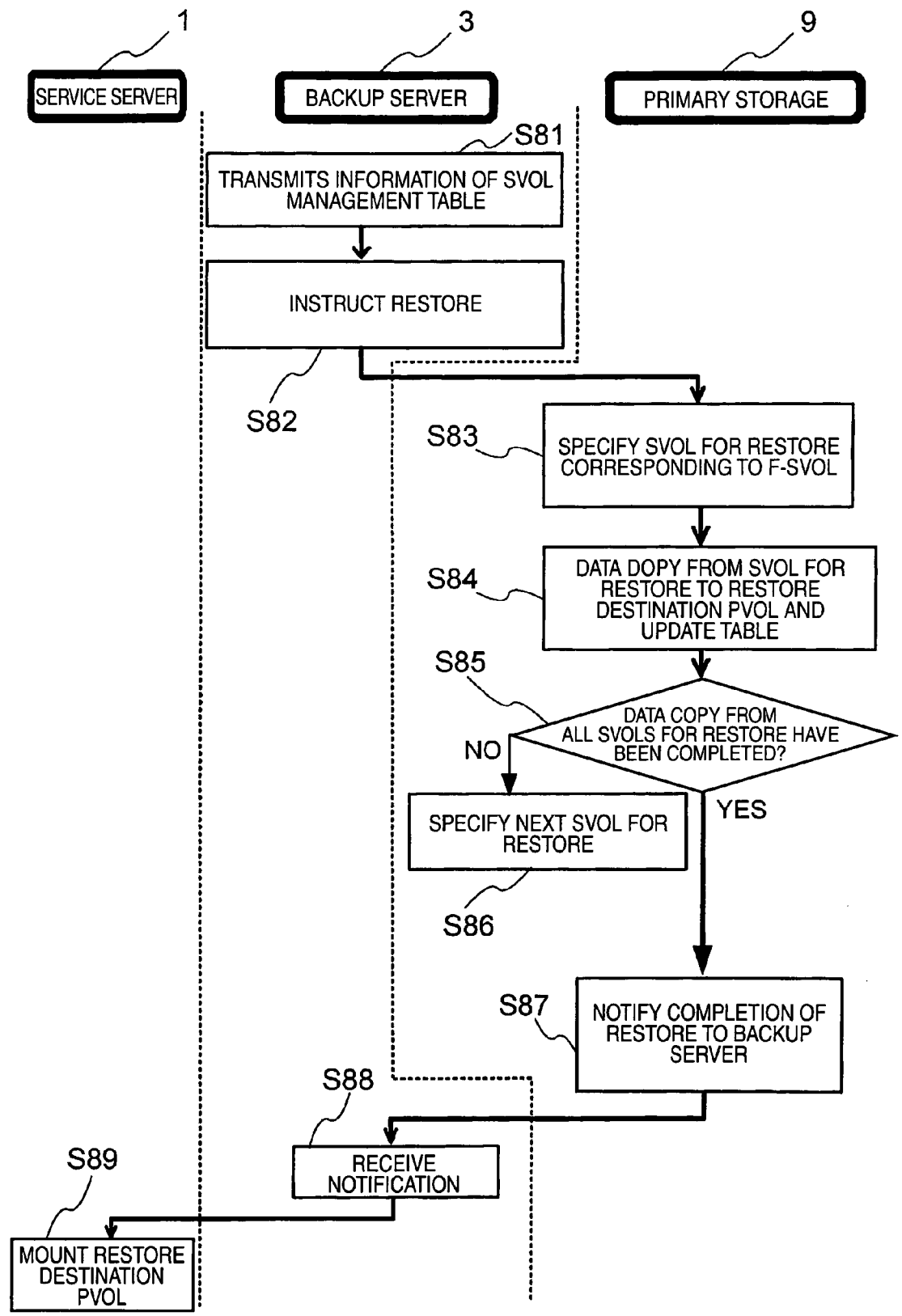
FIG. 16 shows the processing flow of restore from respective SVOLs for restore (restored F-SVOL and D-SVOL) to a PVOL of a restore destination.

FIG. 16 shows the processing flow of restore from the SVOL for restore (restored F-SVOL and D-SVOL) to the restore destination PVOL.

In S81, the B/R software 5 transmits information of SVOL management table 45 stored in the memory of the backup server 3 to the primary storage 9. The restore PG 13 receives the information and stores it in the memory 107.

In S82, the B/R software 5 transmits a restore command to the restore PG13, which is an instruction of data copy from the SVOL for restore to the restore destination PVOL 17'. The restore command designates, for example, at least one of volume IDs of all SVOLs for restore created in the processing of FIG. 15 or the restore destination PVOL 17'.

In S83, the restore PG13 specifies the SVOL for restore corresponding to the nearest F-SVOL in response to the restore command by using information of the SVOL management table 45 received in S81.

In S84, the restore PG13 performs data copy from the specified SVOL for restore to the restore destination PVOL 17' by referring to information of the SVOL management table 45. In this case, the "specified SVOL for restore" is the SVOL for restore corresponding to the nearest F-SVOL when it is just after S83, and is the SVOL for restoring the D-SVOL when it is just after S86.

In S85, the restore PG13 determines whether data copy from all SVOLs for restore created in the processing of FIG. 15 to the restore destination PVOL 17' has been completed or not.

When a result of determination of S85 is negative (No in S85), the restore PG13 specifies the next SVOL for restore in S86. The "next SVOL for restore" is a SVOL for restore corresponding to a D-SVOL corresponding to copy date and hour nearest to copy date and hour corresponding to the nearest F-SVOL, which is the SVOL for restore whose data copy in S84 has not been performed.

In S87, the restore PG13 transmits notification of restore completion to the backup server 3.

In S88, the B/R software 5 receives notification of restore completion.

In S89, the service server 1 mounts the restore destination PVOL 17'.

The preferred embodiment of the invention has been described above, however, it goes without saying that the invention is not limited to the embodiment and can be variously modified in the scope not departing from the gist thereof.

Figure 17:
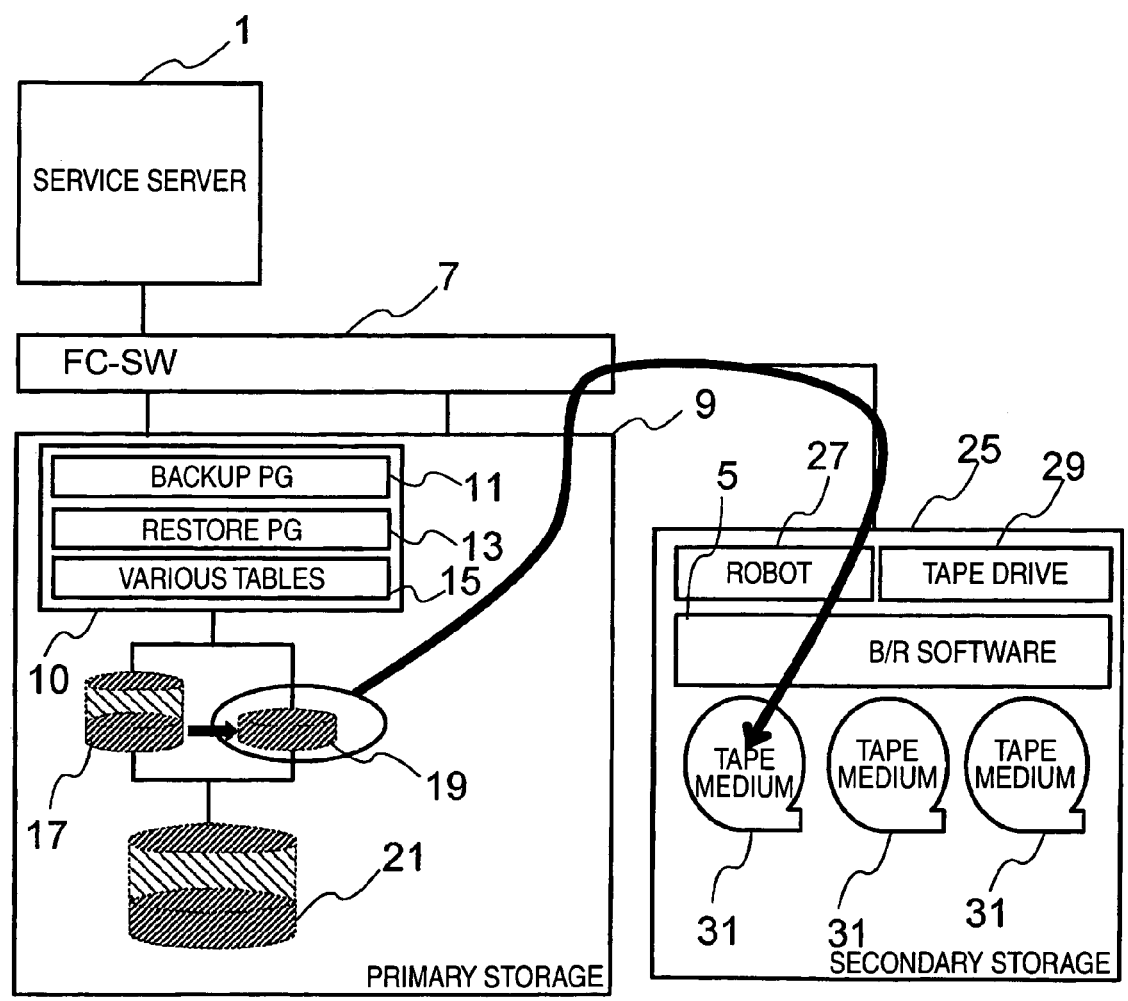
FIG. 17 shows a modified example of a computer system shown in FIG. 1.

For example, it is preferable that a computer system shown in FIG. 17 is applied as the computer system. That is, it is preferable that the back server 3 does not exist and the B/R software 5 is provided in a secondary storage 25.

In addition, the difference is not limited to the difference with respect to the data copy at the time just before, and it may be the difference with respect to the data copy corresponding to full-backup at the time just before. In other words, when update does not occur in a segment P after the data copy (data copy from the PVOL to the D-SVOL) concerning the difference backup was completed, the segment P is not a difference segment P, however, when update has occurred in the segment P even once after the data copy concerning the full-backup at the time just before was completed, the segment P may be the difference segment P as it is even when update has not occurred in the segment P after the data copy concerning difference backup was completed.

What is claimed is:

1. A storage controller which receives an I/O (Input/Output) command which is a write command or a read command from a first external device, comprising:
 a primary virtual volume which is a virtual logical volume including plural primary virtual areas; and
 a controller that includes a storage resource storing virtual area management information that indicates allocations of actual areas of plural actual areas in a pool formed based on physical storage media to the plural primary virtual areas,
 wherein the controller, upon receiving an instruction for a full backup, creates a first secondary volume that is a logical volume corresponding to the primary virtual volume and that includes a number of storage areas that is equal to a number of the primary virtual areas to which actual areas of the pool have been allocated, performs data copy from the primary virtual volume to the first secondary volume by writing data elements stored in the actual areas in the pool allocated to the primary virtual areas to storage areas of the first secondary volume that are respectively allocated as copy destinations for the primary virtual areas to which the actual areas from which the data elements are written are allocated, and reads data elements of backup targets from storage areas of the first secondary volume and transmits the read data elements to a backup destination storage device,
 wherein the controller creates secondary volume management information indicating from which primary virtual area data copy is performed to which storage area of the first secondary volume,
 wherein the storage resource stores difference management information indicating second primary virtual areas which are primary virtual areas updated after the data copy from the primary virtual volume to the first secondary volume,
 wherein the controller is configured to, when a write command designating an address of the primary virtual area in the primary virtual volume is received from the external device and in the case that an actual area has not been allocated to the primary virtual area corresponding to the address designated by the write command, allocate an unallocated actual area in the pool to the primary virtual area, and writes a data element of a write target, in the allocated actual area in accordance with the received write command, and
 wherein the controller updates the difference management information to indicate that the primary virtual area designated by the write command is a second primary virtual area when the write command is received from the first external device after the data copy from the primary virtual volume to the first secondary volume,
 wherein the controller, upon receiving an instruction for a difference backup, creates a difference secondary volume that includes a number of storage areas that is equal to a number of the second primary virtual areas based on the difference management information, respectively performs data copy from the second primary virtual areas in the primary virtual volume to the storage areas in the difference secondary volume, and performs data backup from the difference secondary volume to the backup destination storage device after recognizing the difference secondary volume,
 wherein the controller updates the secondary volume management information to indicate from which second primary virtual areas data copy is performed to which storage areas in the difference secondary volume, difference backup as a backup type for the second primary virtual areas, and a timestamp of when the data copy was performed from the primary virtual volume to the difference secondary volume,
 wherein the controller, upon receiving restore information specifying a point from which the primary virtual volume is restored that indicates the difference secondary volume as a restore target:
 creates a first secondary volume for restore as a restore destination of the first secondary volume that includes a number of storage areas that is equal to the number of storage areas of the first secondary volume,
 creates a second secondary volume for restore as a restore destination of the difference secondary volume that includes a number of storage areas that is equal to the number of storage areas of the difference secondary volume,
 copies the data backed up from the first secondary volume to the backup destination storage device from the backup destination storage device to the first secondary volume for restore,
 performs data copy from the first secondary volume for restore to the primary virtual volume based on correspondences between storage areas of the first secondary volume and the primary virtual areas in the secondary volume management information,
 upon copying the data backed up from the first secondary volume to the first secondary volume for restore, copies the data backed up from the difference secondary volume to the backup destination storage device from the backup destination storage device to the second secondary volume for restore, and upon copying the data backed up from the difference secondary volume to the second secondary volume for restore and performing data copy from the first secondary volume for restore to the primary virtual volume, performs data copy from the second secondary volume for restore to the primary virtual volume based on correspondences between storage areas of the difference secondary volume and primary virtual areas in the difference management information.

2. The storage controller according to claim 1, including the pool, wherein the controller specifies first primary virtual areas of the plural primary virtual areas by referring to the virtual area management information, creates a secondary virtual volume including secondary virtual areas of the same number as the specified primary virtual areas as the first secondary volume, performs data copy from the primary virtual volume to the secondary virtual volume, and writes data elements stored in actual areas allocated to the first primary virtual areas in actual areas allocated to the secondary virtual areas as copy destinations for the first primary virtual areas in the data copy, and reads data elements of backup targets from respective actual areas allocated to respective secondary virtual areas in the secondary virtual volume and transmits the read data elements to a server connected to the backup destination storage device or a second external device which is the backup destination storage device.

3. The storage controller according to claim 2, wherein the controller transmits the secondary volume management information to the backup destination storage device.

4. The storage controller according to claim 3, wherein the controller, upon receiving restore information indicating which point of the primary virtual volume is restored, executes first and second sets of operations, wherein, in executing the first set of operations, the controller:

specifies the number of secondary virtual areas included in the secondary virtual volume of a restore target which is a secondary virtual volume specified from the restore information, creates a secondary virtual volume for restore to be a restore destination of the secondary virtual volume of the restore target, receives respective data elements stored in respective actual areas allocated to respective secondary virtual areas in the secondary virtual volume of the restore target from the second external device, and writes respective data elements received from the second external device in actual areas allocated to respective secondary virtual areas in the secondary virtual volume for restore, and respective secondary virtual areas in the secondary virtual volume for restore corresponds to respective secondary virtual areas in the secondary virtual volume of the restore target, and wherein, in executing the second set of operations, the controller:

performs data copy from respective secondary virtual areas in the secondary virtual volume for restore to respective primary virtual areas in the primary virtual volume of a restore destination which correspond to respective secondary virtual areas by referring to the secondary volume management information, and writes respective data elements stored in respective actual areas allocated to respective secondary virtual areas in corresponding actual areas allocated to respective primary virtual areas in the data copy, and wherein the number of secondary virtual areas included in the secondary virtual volume for restore is the same as the number of secondary virtual areas included in the corresponding secondary virtual volume of the restore target.

5. The storage controller according to claim 4, wherein the virtual area management information includes difference management information indicating second virtual areas which are primary virtual areas updated after the data copy from the primary virtual volume to the secondary virtual volume, wherein the secondary volume management information includes information indicating date and hour when the data copy was performed and information indicating a backup type by each secondary virtual volume created concerning the primary virtual volume, wherein there are full-backup and difference backup as the backup types, wherein, in the full-backup, the number of secondary virtual areas included in the secondary virtual volume to be created is the same as the number of the first primary virtual areas, and wherein the controller updates the virtual area management information to information indicating that the primary virtual area designated by a write command is a second primary virtual area when the write command is received from the first external device after the data copy from the primary virtual volume to the secondary virtual volume, and in the difference backup, specifies second primary virtual areas of the plural primary virtual areas by referring to the virtual area management information, creates a new secondary virtual volume including secondary virtual areas of the same number as the number of the specified second primary virtual areas, performs data copy from respective second primary virtual areas to respective secondary virtual areas in the new secondary virtual volume, allows the secondary volume management information to include information indicating from which second primary virtual area data copy is performed to which secondary virtual area, information indicating the difference backup as the backup type and information indicating the date and hour when the data copy was performed concerning the new secondary virtual volume, reads data elements of backup targets from respective actual areas allocated to respective secondary virtual areas in the new secondary virtual volume and transmits the read data elements to the second external device, and upon allowing the secondary volume management information to include information indicating from which second primary virtual area data copy is performed to which secondary virtual area, information indicating the difference backup as the backup type and information indicating the date and hour when the data copy was performed concerning the new secondary virtual volume, transmits the secondary volume management information to the second external device, and wherein the controller resets the difference management information at every data copy in the full-backup and the difference backup, or at every data copy in the full-backup.

6. The storage controller according to claim 5, wherein, when the secondary virtual volume specified from the restore information is the secondary virtual volume corresponding to the difference backup, respective secondary virtual volumes are secondary virtual volumes of restore targets, wherein the respective secondary virtual volumes include a first restore target secondary virtual volume corresponding to the restore information and a second restore target secondary virtual volume whose data copy was performed in full-backup at date and hour of data copy which is prior as well as nearest to date and hour of data copy of the secondary virtual volume corresponding to the restore information and wherein, in the plural secondary volumes of restore targets, the first restore target secondary volume is the latest, and the second restore target secondary volume is the oldest, and wherein the controller executes the first and second sets of operations with respect to the respective secondary volumes of restore targets, and executes the second set of operations in the order from an older secondary volume of the restore target at that time.

7. The storage controller according to claim 6, wherein there are plural pools including first and second pools, wherein a physical storage medium as a basis of the first pool is different from a physical storage medium as a basis of the second pool, wherein actual areas in the first pool are allocated to the primary virtual areas and wherein actual areas in the second pool are allocated to the secondary virtual area.

8. The storage controller according to claim 2, wherein a control module performs data backup from the secondary virtual volume to the physical storage media in the backup destination storage device after recognizing the secondary virtual volume.

9. The storage controller according to claim 8, wherein the controller transmits the secondary volume management information to the control module, and wherein the control module manages the secondary volume management information received from the controller.

10. The storage controller according to claim 9, wherein the controller
receives restore information indicating which point of the primary virtual volume is restored from the control module, creates a secondary volume for restore to be a restore destination of the secondary volume of the restore target which is the secondary volume specified from the restore information, and wherein the control module copies data to the secondary volume for restore from physical storage media in the storage device of the backup destination which store data in the secondary volume of the restore target after recognizing the secondary volume for restore, and transmits the secondary volume management information to the controller, and wherein the controller performs data copy from the secondary volume for restore to the primary virtual volume of the restore destination based on the correspondence between storage areas and primary virtual areas which is written in the secondary volume management information, and the number of storage areas included in the secondary volume for restore is the same as the number of storage areas included in a corresponding secondary volume of the restore target.

11. The storage controller according to claim 9, wherein the control module instructs any of full-backup and the difference backup, when the controller receives an instruction for the full-backup, the number of secondary virtual areas included in the secondary virtual volume to be created is the same as the number of first virtual areas, when the controller receives an instruction for the difference backup, the controller specifies the second primary virtual areas of the plural primary virtual areas by referring to the difference management information, creates a new secondary volume including storage areas of the same number as the number of specified second primary virtual areas, performs data copy from respective second primary virtual volume to respective storage areas in the new secondary volume, and wherein the control module performs data backup from the new secondary volume to physical storage media in the backup-destination storage device after recognizing the new secondary volume.

12. The storage controller according to claim 11, wherein the controller accepts restore information indicating which point of the primary virtual volume is restored from the control module, wherein, when the secondary volume specified from the restore information is a secondary volume corresponding to the difference backup, plural respective secondary volumes are secondary volumes of the restore targets, wherein the plural respective secondary volumes include a first restore target secondary volume corresponding to the restore information and a second restore target secondary volume whose data copy was performed in full-backup at date and hour of data copy which is prior as well as nearest to the date and hour of data copy of the secondary volume corresponding to the restore information, and wherein, in the plural secondary volumes of restore targets, the first restore target secondary volume is the latest, and the second restore target secondary volume is the oldest, wherein, concerning respective plural secondary volumes of restore targets, the controller creates a secondary volume for restore to be a restore destination of the secondary volumes of restore targets, the control module copies data from physical storage media in the backup destination storage device which store data in the secondary volumes of restore targets to the secondary volume for restore after recognizing the secondary volume for restore, the controller, based on correspondence between storage areas and primary virtual areas which are written in the secondary volume management information, performs data copy from the secondary volume for restore to the primary virtual volume of a restore destination in the order from an older secondary volume of the restore target and wherein the number of storage areas included in each secondary volume for restore is the same as the number of storage areas included in each corresponding secondary volume of the restore target.

13. The storage controller according to claim 8, wherein the control module is provided at the server connected to the backup destination storage device or the backup destination storage device.

14. A method of backing up data in a storage device that comprises a primary virtual volume, which is a virtual logical volume including plural primary virtual areas, the method comprising:
storing virtual area management information that indicates allocations of actual areas of plural actual areas in a pool formed based on physical storage media to the plural primary virtual areas;
creating a first secondary volume, upon receiving an instruction for a full backup, that is a logical volume corresponding to the primary virtual volume and that includes a number of storage areas that is equal to a number of the primary virtual areas to which actual areas of the pool have been allocated, performing data copy from the primary virtual volume to the first secondary volume by writing data elements stored in the actual areas in the pool allocated to the primary virtual areas to storage areas of the first secondary volume that are respectively allocated as copy destinations for the primary virtual areas to which the actual areas from which the data elements are written are allocated, and reading data elements of backup targets from storage areas of the first secondary volume and transmitting the read data elements to a backup destination storage device;

creating secondary volume management information indicating from which primary virtual area data copy is performed to which storage area of the first secondary volume;

storing difference management information indicating second primary virtual areas which are primary virtual areas updated after the data copy from the primary virtual volume to the first secondary volume;

upon receiving a write command designating an address of the primary virtual area in the primary virtual volume from the external device and in the case that an actual area has not been allocated to the primary virtual area corresponding to the address designated by the write command, allocating an unallocated actual area in the pool to the primary virtual area, and writes a data element of a write target, in the allocated actual area in accordance with the received write command;

updating the difference management information to indicate that the primary virtual area designated by the write command is a second primary virtual area when the write command is received from the first external device after the data copy from the primary virtual volume to the first secondary volume;

upon receiving an instruction for a difference backup, creating a difference secondary volume that includes a number of storage areas that is equal to a number of the second primary virtual areas based on the difference management information, respectively performing data copy from the second primary virtual areas in the primary virtual volume to the storage areas in the difference secondary volume, and performing data backup from the difference secondary volume to the backup destination storage device after recognizing the difference secondary volume;

updating the secondary volume management information to indicate from which second primary virtual areas data copy is performed to which storage areas in the difference secondary volume, difference backup as a backup type for the second primary virtual areas, and a timestamp of when the data copy was performed from the primary virtual volume to the difference secondary volume;

upon receiving restore information specifying a point from which the primary virtual volume is restored that indicates the difference secondary volume as a restore target, creating a first secondary volume for restore as a restore destination of the first secondary volume that includes a number of storage areas that is equal to the number of storage areas of the first secondary volume, and creating a second secondary volume for restore as a restore destination of the difference secondary volume that includes a number of storage areas that is equal to the number of storage areas of the difference secondary volume;

copying the data backed up from the first secondary volume to the backup destination storage device from the backup destination storage device to the first secondary volume for restore;

performing data copy from the first secondary volume for restore to the primary virtual volume based on correspondences between storage areas of the first secondary volume and the primary virtual areas in the secondary volume management information;

upon copying the data backed up from the first secondary volume to the first secondary volume for restore, copying the data backed up from the difference secondary volume to the backup destination storage device from the backup destination storage device to the second secondary volume for restore; and upon copying the data backed up from the difference secondary volume to the second secondary volume for restore and performing data copy from the first secondary volume for restore to the primary virtual volume, performing data copy from the second secondary volume for restore to the primary virtual volume based on correspondences between storage areas of the difference secondary volume and primary virtual areas in the difference management information.

* * * * *